US009219921B2

(12) United States Patent
Joshi et al.

(10) Patent No.: US 9,219,921 B2
(45) Date of Patent: Dec. 22, 2015

(54) MIXED TAP FILTERS

(75) Inventors: Rajan L. Joshi, San Diego, CA (US); Marta Karczewicz, San Diego, CA (US); Wei-Jung Chien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 13/012,583

(22) Filed: Jan. 24, 2011

(65) Prior Publication Data

US 2011/0249737 A1    Oct. 13, 2011

Related U.S. Application Data

(60) Provisional application No. 61/323,250, filed on Apr. 12, 2010, provisional application No. 61/350,743, filed on Jun. 2, 2010, provisional application No. 61/361,188, filed on Jul. 2, 2010.

(51) Int. Cl.
| | | |
|---|---|---|
| H04N 7/12 | (2006.01) | |
| H04N 19/523 | (2014.01) | |
| H04N 19/70 | (2014.01) | |
| H04N 19/117 | (2014.01) | |
| H04N 19/82 | (2014.01) | |

(52) U.S. Cl.
CPC ........... *H04N 19/523* (2014.11); *H04N 19/117* (2014.11); *H04N 19/70* (2014.11); *H04N 19/82* (2014.11)

(58) Field of Classification Search
USPC ........................................ 375/240.01, 240.12
See application file for complete search history.

(56) References Cited

U.S. PATENT DOCUMENTS

| | | | |
|---|---|---|---|
| 6,556,716 B2 * | 4/2003 | Hong | ............................ 382/232 |
| 8,462,842 B2 | 6/2013 | Ye et al. | |
| 2003/0202607 A1 | 10/2003 | Srinivasan | |
| 2004/0076333 A1 | 4/2004 | Zhang et al. | |
| 2006/0146935 A1 | 7/2006 | Winger | |
| 2007/0110159 A1 | 5/2007 | Wang et al. | |
| 2008/0069203 A1 * | 3/2008 | Karczewicz et al. | .... 375/240.01 |
| 2008/0075165 A1 | 3/2008 | Ugur et al. | |
| 2008/0247467 A1 * | 10/2008 | Rusanovskyy et al. | .. 375/240.16 |
| 2008/0310509 A1 | 12/2008 | Goel | |

(Continued)

FOREIGN PATENT DOCUMENTS

| | | |
|---|---|---|
| CN | 101232622 A | 7/2008 |
| CN | 101632306 A | 1/2010 |

(Continued)

OTHER PUBLICATIONS

Anonymous, "H.264 and MPEG-4 Video Compression, chapter 6, H.264/MPEG4 Part 10, Iain E. Richardson", Not Known, Oct. 17, 2003, XP030001626, p. 172-175.

(Continued)

*Primary Examiner* — Tracy Li
(74) *Attorney, Agent, or Firm* — John Rickenbrode

(57) ABSTRACT

During the prediction stage of a video encoding and/or decoding process, a video coder can use relatively longer filters for certain motion vectors pointing to certain sub-pixel positions and relatively shorter filters for motion vectors pointing to other sub-pixel positions, where a longer filter generally refers to an interpolation filter with a greater number of filter coefficients, also called taps, while a shorter filter generally refers to an interpolation filter with fewer taps.

37 Claims, 13 Drawing Sheets

(56) References Cited

U.S. PATENT DOCUMENTS

| | | | |
|---|---|---|---|
| 2009/0097547 A1* | 4/2009 | Ugur et al. | 375/240.02 |
| 2009/0129470 A1* | 5/2009 | Sato et al. | 375/240.15 |
| 2009/0245694 A1 | 10/2009 | Sartor et al. | |
| 2009/0257493 A1 | 10/2009 | Ye et al. | |
| 2009/0257500 A1 | 10/2009 | Karczewicz et al. | |
| 2009/0257501 A1 | 10/2009 | Ye et al. | |
| 2010/0111182 A1 | 5/2010 | Karczewicz et al. | |

FOREIGN PATENT DOCUMENTS

| | | |
|---|---|---|
| EP | 1432249 A1 | 6/2004 |
| EP | 1617672 A1 | 1/2006 |
| JP | 2003333599 A | 11/2003 |
| JP | 2010010950 A | 1/2010 |
| TW | 201112771 A | 4/2011 |
| WO | 2009126924 A1 | 10/2009 |
| WO | 2009126928 A1 | 10/2009 |
| WO | WO2009126936 A1 | 10/2009 |
| WO | 2010039288 A1 | 4/2010 |

OTHER PUBLICATIONS

International Search Report and Written Opinion—PCT/US2011/031998, ISA/EPO—Jun. 27, 2011.

Thomas Wedi, "Results of Complexity and Coding Performance Investigations: Displacement Vector resolution and Interpolation Filter Tap Size", ITU Study Group 16—Video Coding Experts Group—ISO/IEC MPEG & ITU-T VCEG(ISO/IEC JTC1/SC29/WG11 and ITU-T SG16 Q6), XX, XX, No. VCEG-M46, Jun. 12, 2001, XP030003253.

Taiwan Search Report—TW100112669—TIPO—Jul. 9, 2013.

* cited by examiner

FIG. 6
FIG. 7

MIXED TAP FILTERS

This application claims the benefit of U.S. Provisional Application 61/323,250 filed on 12 Apr. 2010; U.S. Provisional Application 61/350,743 filed on 2 Jun. 2010; and U.S. Provisional Application 61/361,188, filed 2 Jul. 2010, the entire contents each of which are incorporated herein by reference.

TECHNICAL FIELD

This disclosure relates to digital video encoding and decoding and, more particularly, to filtering techniques applied to generate predictive data used in the video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, digital cameras, digital recording devices, video gaming devices, video game consoles, cellular or satellite radio telephones, smart phones, and the like. Digital video devices implement video compression techniques, such as those described in standards defined by MPEG-2, MPEG-4, or ITU-T H.264/MPEG-4, Part 10, Advanced Video Coding (AVC), to transmit and receive digital video information more efficiently. Video compression techniques may perform spatial prediction and/or temporal prediction to reduce or remove redundancy inherent in video sequences.

Block based inter-coding is a very useful coding technique that relies on temporal prediction to reduce or remove temporal redundancy between video blocks of successive coded units of a video sequence. The coded units may comprise video frames, slices of video frames, groups of pictures, or another defined unit of encoded video blocks. For inter-coding, the video encoder performs motion estimation and motion compensation to track the movement of corresponding video blocks of two or more adjacent coded units. Motion estimation generates motion vectors, which indicate the displacement of video blocks relative to corresponding prediction video blocks in one or more reference frames or other coded units. Motion compensation uses the motion vectors to generate prediction video blocks from the one or more reference frames or other coded units. After motion compensation, residual video blocks are formed by subtracting prediction video blocks from the original video blocks being coded.

The video encoder may also apply transform, quantization and entropy coding processes to further reduce the bit rate associated with communication of residual blocks. Transform techniques may comprise discrete cosine transforms (DCTs) or conceptually similar processes. Alternatively, wavelet transforms, integer transforms, or other types of transforms may be used. In a DCT process, as an example, a set of pixel values are converted into transform coefficients, which may represent the energy of the pixel values in the frequency domain. Quantization is applied to the transform coefficients, and generally involves a process that reduces the number of bits associated with any given transform coefficient. Entropy coding comprises one or more processes that collectively compress a sequence of coding modes, motion information, coded block patterns, and quantized transform coefficients. Examples of entropy coding include but are not limited to content adaptive variable length coding (CAVLC) and context adaptive binary arithmetic coding (CABAC).

A coded video block may be represented by prediction information that can be used to create or identify a predictive block, and a residual block of data indicative of differences between the block being coded and the predictive block. The prediction information may comprise the one or more motion vectors that are used to identify the predictive block of data. Given the motion vectors, the decoder is able to reconstruct the predictive blocks that were used to code the residual. Thus, given a set of residual blocks and a set of motion vectors (and possibly some additional syntax), the decoder can reconstruct a video frame that was originally encoded. Inter-coding based on motion estimation and motion compensation can achieve very good compression because successive video frames or other types of coded units are often very similar. An encoded video sequence may comprise blocks of residual data, motion vectors, and possibly other types of syntax.

Interpolation techniques have been developed in order to improve the level of compression that can be achieved in inter-coding. In this case, the predictive data generated during motion compensation, which is used to code a video block, may be interpolated from the pixels of video blocks of the video frame or other coded unit used in motion estimation. Interpolation is often performed to generate predictive half pixel (half-pel) values and predictive quarter pixel (quarter-pel) values. The half- and quarter-pel values are associated with sub-pixel locations. Fractional motion vectors may be used to identify video blocks at the sub-pixel resolution in order to capture fractional movement in a video sequence, and thereby provide predictive blocks that are more similar to the video blocks being coded than the integer video blocks.

SUMMARY

In general, this disclosure describes filtering techniques applied by an encoder and a decoder during the prediction stage of a video encoding and/or decoding process. Aspects of the described filtering techniques may enhance the accuracy of predictive data used during fractional interpolation, and in some cases, may improve predictive data of integer blocks of pixels. There are several aspects to this disclosure, including using relatively longer filters for certain motion vectors pointing to certain sub-pixel positions and relatively shorter filters for motion vectors pointing to other sub-positions positions.

To design filters with good frequency response for interpolation purposes, it may be desirable to use relatively longer filters (for example, 8 coefficients, or taps, instead of 6). Such longer filters can improve the compression efficiency of the video coder at the cost of greater computational complexity. To get the benefit of better performance with a longer filter without a large increase in computational complexity, techniques described in this disclosure include the use of a mixture of long filters and short filters. If, for example, the motion vector points to positions where a single filtering is needed, then an 8-tap filter can be used. For the positions where two filtering operations are needed, 6-tap filters can be used. Thus, the worst case complexity is still bounded by two filtering operations with the 6-tap filters, which is the same as in case of the H.264 standard, but the use of 8-tap filters may produce improved predictive data compared to the H.264 standard.

Other aspects of this disclosure concern techniques for encoding information in the bitstream to convey the type of filter, and possibly the filter coefficients used. These and other aspects of this disclosure will become apparent from the description below.

In one example, this disclosure provides a method that includes obtaining a block of pixels, wherein the block of pixels includes integer pixel values corresponding to integer pixel positions within the block of pixels; computing a first sub-pixel value for a first sub-pixel position, wherein computing the first sub-pixel value comprises applying a first interpolation filter defining a first one-dimensional array of filter coefficients corresponding to filter support positions; computing a second sub-pixel value for a second sub-pixel position, wherein computing the second sub-pixel value comprises applying a second interpolation filter defining a second one-dimensional array of filter coefficients corresponding to horizontal filter support positions and applying a third interpolation filter defining a third one-dimensional array of filter coefficients corresponding to vertical filter support positions, wherein: the first one-dimensional array comprises more filter coefficients than the second one-dimensional array; the first one-dimensional array comprises more filter coefficients than the third one-dimensional array; and generating a prediction block based on at least the first sub-pixel value and the second sub-pixel value.

In another example, this disclosure provides an apparatus comprising a prediction unit configured to: obtain a block of pixels, wherein the block of pixels includes integer pixel values corresponding to integer pixel positions within the block of pixels; compute a first sub-pixel value and a second sub-pixel value, wherein a first sub-pixel value is computed by applying a first interpolation filter defining a first one-dimensional array of filter coefficients corresponding to filter support positions; a second sub-pixel value is computed by applying a second interpolation filter defining a second one-dimensional array of filter coefficients corresponding to horizontal filter support positions and applying a third interpolation filter defining a third one-dimensional array of filter coefficients corresponding to vertical filter support positions; the first one-dimensional array comprises more filter coefficients than the second one-dimensional array; the first one-dimensional array comprises more filter coefficients than the third one-dimensional array; and generate a prediction block based on at least the first sub-pixel value and the second sub-pixel value.

In another example, this disclosure provides an apparatus that includes means for obtaining a block of pixels, wherein the block of pixels includes integer pixel values corresponding to integer pixel positions within the block of pixels; means for computing a first sub-pixel value for a first sub-pixel position, wherein computing the first sub-pixel value comprises applying a first interpolation filter defining a first one-dimensional array of filter coefficients corresponding to filter support positions; means for computing a second sub-pixel value for a second sub-pixel position, wherein computing the second sub-pixel value comprises applying a second interpolation filter defining a second one-dimensional array of filter coefficients corresponding to horizontal filter support positions and applying a third interpolation filter defining a third one-dimensional array of filter coefficients corresponding to vertical filter support positions, wherein: the first one-dimensional array comprises more filter coefficients than the second one-dimensional array; the first one-dimensional array comprises more filter coefficients than the third one-dimensional array; and means for generating a prediction block based on at least the first sub-pixel value and the second sub-pixel value.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a non-transitory, computer readable storage medium tangibly storing one or more instructions, which when executed by one or more processors cause the one or more processors to: obtain a block of pixels, wherein the block of pixels includes integer pixel values corresponding to integer pixel positions within the block of pixels; compute a first sub-pixel value for a first sub-pixel position, wherein computing the first sub-pixel value comprises applying a first interpolation filter defining a first one-dimensional array of filter coefficients corresponding to filter support positions; compute a second sub-pixel value for a second sub-pixel position, wherein computing the second sub-pixel value comprises applying a second interpolation filter defining a second one-dimensional array of filter coefficients corresponding to horizontal filter support positions and applying a third interpolation filter defining a third one-dimensional array of filter coefficients corresponding to vertical filter support positions, wherein: the first one-dimensional array comprises more filter coefficients than the second one-dimensional array; the first one-dimensional array comprises more filter coefficients than the third one-dimensional array; and generate a prediction block based on at least the first sub-pixel value and the second sub-pixel value.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 6 is a conceptual diagram illustrating a horizontal 8 pixel filter support with coefficient symmetry, relative to a sub-pixel location.

FIG. 7 is a conceptual diagram illustrating a horizontal 8 pixel filter support without coefficient symmetry, relative to a sub-pixel location.

DETAILED DESCRIPTION

This disclosure describes filtering techniques applied by an encoder and a decoder during the prediction stage of a video encoding and/or decoding process. The described filtering techniques may improve the accuracy of predictive data used during fractional interpolation, and in some cases, may improve predictive data of integer blocks of pixels. There are several aspects to this disclosure, including the use of relatively longer filters for certain motion vectors pointing to certain sub-pixel positions and relatively shorter filters for motion vectors pointing to other sub-pixel positions. A longer filter generally refers to an interpolation filter with a greater number of filter coefficients, also called taps, while a shorter filter generally refers to an interpolation filter with fewer taps. In general, the phrases "longer filter" and "shorter filter" are relative terms meaning that the longer filter is longer than the shorter filter and that the shorter filter is shorter than the longer filter. These phrases, however, do not otherwise require any specific lengths as long as the longer filter is longer than the shorter filter and that the shorter filter is shorter than the longer filter. For example, if referencing an 8-tap filter and a 6-tap filter, the 8-tap filter would be the longer filter, and the 6-tap filter would be the shorter filter. If, however, referencing an 8-tap filter and a 10-tap filter, the 8-tap filter would be the shorter filter.

Filters with more taps generally provide a better frequency response for interpolation purposes compared to filters with fewer taps. For example, a filter with 8 taps generally produces a better frequency response than a filter with 6 taps. Compared to shorter filters, longer filters may improve the compression efficiency of the video coder at the cost of greater computational complexity. To get the benefit of better performance with a longer filter without a large increase in computational complexity, aspects of this disclosure include the use of a mixture of long filters and short filters. If, for example, the motion vector points to a sub-pixel location where a single filtering operation is needed, then an 8-tap filter can be used. For the sub-pixel locations where two filtering operations are needed, shorter filters, such as two 6-tap filters can be used. Thus, as long as the difference in the number of taps between the shorter and the longer filter is not too large, the worst case complexity is still generally bounded by two filtering operations with the shorter filters.

Figure 1:
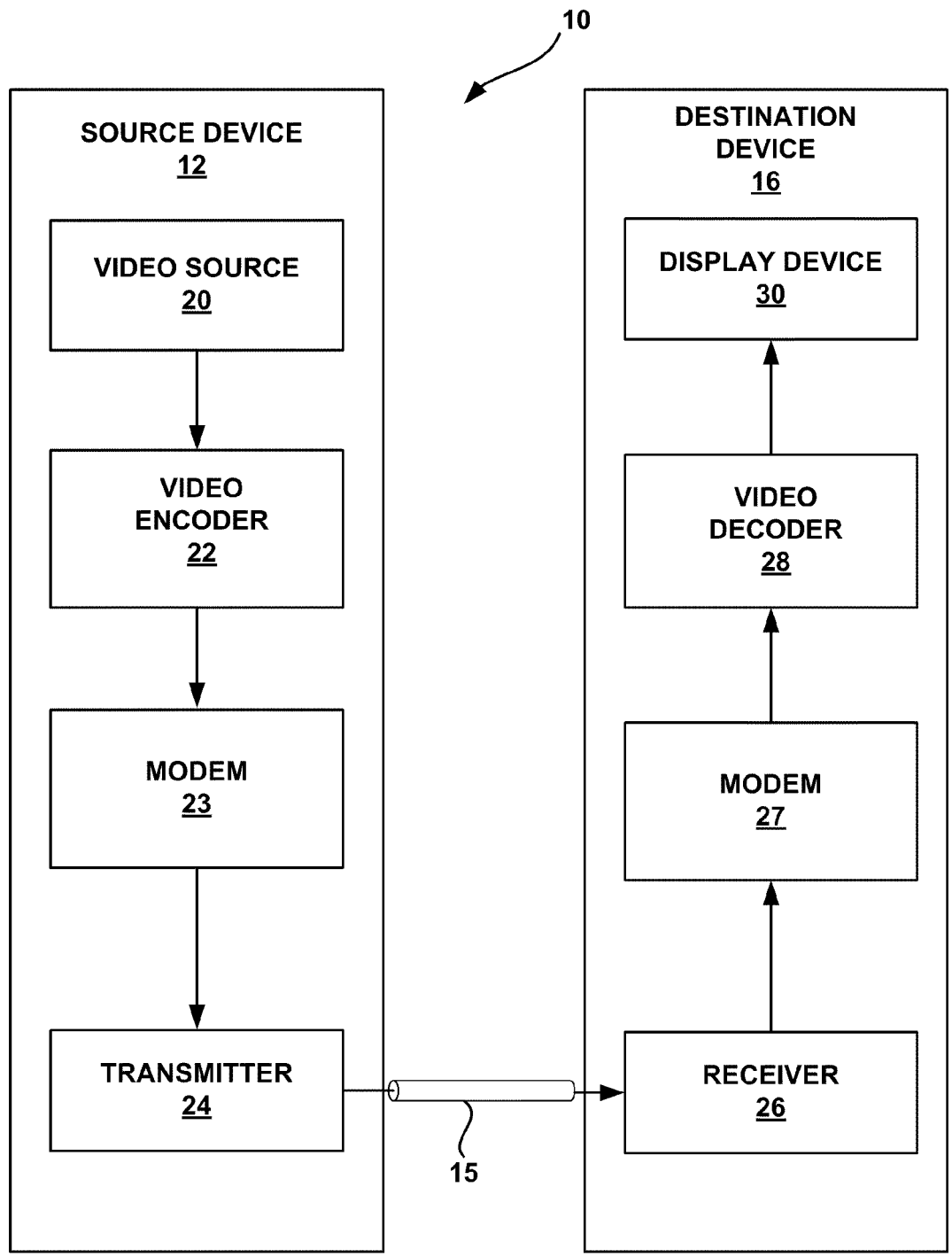
FIG. 1 is a block diagram illustrating one exemplary video encoding and decoding system that may implement techniques of this disclosure.

FIG. 1 is a block diagram illustrating one exemplary video encoding and decoding system 10 that may be used to implement aspects of this disclosure. As shown in FIG. 1, system 10 includes a source device 12 that transmits encoded video data to a destination device 16 via a communication channel 15. Source device 12 and destination device 16 may comprise any of a wide range of devices. In some cases, source device 12 and destination device 16 comprise wireless communication devices, such as wireless handsets, so-called cellular or satellite radiotelephones, or any wireless devices that can communicate video information over a communication channel 15, in which case communication channel 15 is wireless. The techniques of disclosure, however, which concern filtering and the generation of predictive data during predictive coding, are not necessarily limited to wireless applications or settings. Thus, aspects of this disclosure may also be useful in a wide rage of other settings and devices, including devices that communicate via physical wires, optical fibers or other physical or wireless media. In addition, the encoding or decoding techniques may also be applied in a stand alone device that does not necessarily communicate with any other device.

In the example of FIG. 1, source device 12 may include a video source 20, video encoder 22, modulator/demodulator (modem) 23 and transmitter 24. Destination device 16 may include a receiver 26, modem 27, video decoder 28, and display device 30. In accordance with this disclosure, video encoder 22 of source device 12 may be configured to apply one or more of the techniques of this disclosure as part of a video encoding process. Similarly, video decoder 28 of destination device 16 may be configured to apply one or more of the techniques of this disclosure as part of a video decoding process.

Again, the illustrated system 10 of FIG. 1 is merely exemplary. The various techniques of this disclosure may be performed by any encoding device that supports block-based predictive encoding, or by any decoding device that supports block-based predictive decoding. Source device 12 and destination device 16 are merely examples of such coding devices in which source device 12 generates coded video data for transmission to destination device 16. In some cases, devices 12, 16 may operate in a substantially symmetrical manner such that, each of devices 12, 16 include video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitter 24 and communication channel 15. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over communication channel 15, and modem 27 demodulates the information. Like transmitter 24, receiver 26 may include circuits designed for receiving data, including amplifiers, filters, and one or more antennas. In some instances, transmitter 24 and/or receiver 26 may be incorporated within a single transceiver component that include both receive and transmit circuitry. Modem 27 may include various mixers, filters, amplifiers or other components designed for signal demodulation. In some instances, modems 23 and 27 may include components for performing both modulation and demodulation.

Again, the video encoding process performed by video encoder 22 may implement one or more of the techniques described herein during motion compensation. The video decoding process performed by video decoder 28 may also perform such techniques during its motion compensation stage of the decoding process. The term "coder" is used herein to refer to a specialized computer device or apparatus that performs video encoding or video decoding. The term "coder" generally refers to any video encoder, video decoder, or combined encoder/decoder (codec). The term "coding" refers to encoding or decoding. Display device 30 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 22 and video decoder 28 may operate according to one or more video compression standards, such as the ITU-T H.264 standard, alternatively described as MPEG-4, Part 10, Advanced Video Coding (AVC), or may operating according to a next-generation video compression standard. The techniques of this disclosure, however, are not limited to any particular video coding standard. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined codec that provides encoding and decoding capabilities in a respective mobile device, subscriber device, broadcast device, server, or the like.

A video sequence typically includes a series of video frames. Video encoder 22 operates on video blocks within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform (DCT) or a conceptually similar transformation process.

Smaller video blocks can provide better resolution, and may be used for locations of a video frame that include high levels of detail. In general, macroblocks and the various sub-blocks may be considered to be video blocks. In addition, a slice may be considered to be a series of video blocks, such as macroblocks and/or sub-blocks. Each slice may be an independently decodable unit of a video frame. Alternatively, frames themselves may be decodable units, or other portions of a frame may be defined as decodable units. The term "coded unit" refers to any independently decodable unit of a video frame such as an entire frame, a slice of a frame, or another independently decodable unit defined according to the coding techniques used.

To encode the video blocks, video encoder 22 performs intra- or inter-prediction to generate a prediction block. Video encoder 22 subtracts the prediction blocks from the original video blocks to be encoded to generate residual blocks. Thus, the residual blocks are indicative of differences between the blocks being coded and the prediction blocks. Video encoder 22 may perform a transform on the residual blocks to generate blocks of transform coefficients. Following intra- or inter-based predictive coding and transformation techniques, video encoder 22 performs quantization. Quantization generally refers to a process in which coefficients are quantized to possibly reduce the amount of data used to represent the coefficients. Following quantization, entropy coding may be performed according to an entropy coding methodology, such as context adaptive variable length coding (CAVLC) or context adaptive binary arithmetic coding (CABAC). More details of each step of the encoding process performed by video encoder 22 will be described in more detail below in FIG. 2.

In destination device 16, video decoder 28 receives the encoded video data. Video decoder 28 entropy decodes the received video data according to an entropy coding methodology, such as CAVLC or CABAC, to obtain the quantized coefficients. Video decoder 28 applies inverse quantization (de-quantization) and inverse transform functions to reconstruct the residual block in the pixel domain. Video decoder 28 also generates a prediction block based on control information or syntax information (e.g., coding mode, motion vectors, syntax that defines filter coefficients and the like) included in the encoded video data. Video decoder 28 sums the prediction block with the reconstructed residual block to produce a reconstructed video block for display. More details of each step of the decoding process performed by video decoder 28 will be described in more detail below in reference to FIG. 10.

According to aspects of this disclosure, video encoder 22 and video decoder 28 may use the one or more interpolation filtering techniques during motion compensation. In particular, in accordance with one aspect of this disclosure, video encoder 22 and/or video decoder 28 may obtain a block of pixels containing integer pixel values corresponding to integer pixel positions and use a mixture of longer filters and shorter pixels to determine sub-pixel values for the block of pixels.

Figure 2:
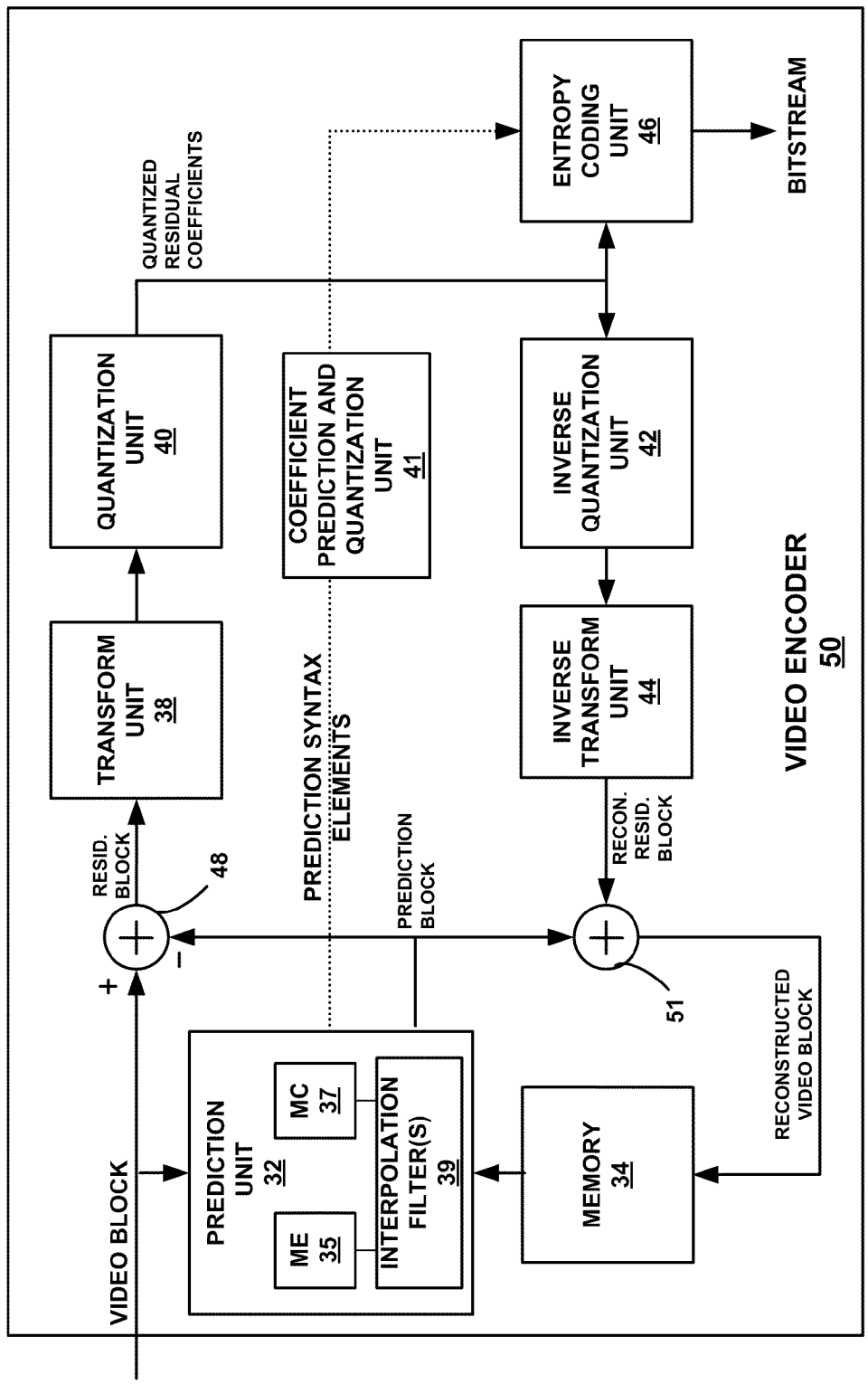
FIG. 2 is a block diagram illustrating an example of a video encoder that may perform filtering techniques consistent with this disclosure.

FIG. 2 is a block diagram illustrating an example of a video encoder 50 that may perform filtering techniques consistent with this disclosure. Video encoder 50 is one example of a specialized video computer device or apparatus referred to herein as a "coder." Video encoder 50 may correspond to video encoder 22 of device 20, or a video encoder of a different device. Video encoder 50 may perform intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode, and Inter-modes such as a prediction (P-mode) or a bi-directional (B-mode) may refer to the temporal based compression modes. The techniques of this disclosure apply during inter-coding, and therefore, intra-coding units such as spatial prediction unit are not illustrated in FIG. 2 for simplicity and ease of illustration.

As shown in FIG. 2, video encoder 50 receives a video block within a video frame to be encoded. In the example of FIG. 2, video encoder 50 includes a prediction unit 32, memory 34, an adder 48, a transform unit 38, a quantization unit 40, and an entropy coding unit 46. For video block reconstruction, video encoder 50 also includes an inverse quantization unit 42, an inverse transform unit 44, and an adder 51. A deblocking filter (not shown) may also be included to filter block boundaries to remove blockiness artifacts from reconstructed video. If desired, the deblocking filter would typically filter the output of adder 51.

Prediction unit 32 may include a motion estimation (ME) unit 35, and a motion compensation (MC) unit 37. Filter unit 39 may be included in prediction unit 32 and may be invoked by one or both of ME unit 35 and MC unit 37 to perform interpolation or interpolation-like filtering as part of motion estimation and/or motion compensation, according to this disclosure. Filter unit 39 may actually represent a plurality of different filters to facilitate numerous different types of inter-polation and interpolation-type filtering as described herein. Thus, prediction unit 32 may include a plurality of interpolation or interpolation-like filters. Additionally, filter unit 39 may include a plurality of filter indexes for a plurality of sub-pixel locations. Filter indexes associate a bit pattern and a sub-pixel location with a particular interpolation filter. During the encoding process, video encoder 50 receives a video block to be coded (labeled "VIDEO BLOCK" in FIG. 2), and prediction unit 32 performs inter-prediction coding to generate a prediction block (labeled "PRED. BLOCK" in FIG. 2). Specifically, ME unit 35 may perform motion estimation to identify the prediction block in memory 34, and MC unit 37 may perform motion compensation to generate the prediction block.

Motion estimation is typically considered the process of generating motion vectors, which estimate motion for video blocks. A motion vector, for example, may indicate the displacement of a prediction block within a prediction or reference frame (or other coded unit, e.g., slice) relative to the block to be coded within the current frame (or other coded unit). The reference frame (or portion of the frame) may be temporally located prior to or after the video frame (or portion of the video frame) to which the current video block belongs. Motion compensation is typically considered the process of fetching or generating the prediction block from memory 34, or possibly interpolating or otherwise generating filtered predictive data based on the motion vector determined by motion estimation.

ME unit 35 selects the appropriate motion vector for the video block to be coded by comparing the video block to video blocks of one or more reference frames (e.g., a previous and/or subsequent frame). ME unit 35 may perform motion estimation with fractional pixel precision, sometimes referred to as fractional pixel, fractional pel, or sub-pixel motion estimation. As such, the terms fractional pixel, fractional pel, and sub-pixel motion estimation may be used interchangeably. In fractional pixel motion estimation, ME unit 35 may select a motion vector that indicates displacement to a location other than an integer pixel location. In this manner, fractional pixel motion estimation allows prediction unit 32 to track motion with higher precision than integer-pixel (or full-pixel) locations, thus generate a more accurate prediction block. Fractional pixel motion estimation may have half-pixel precision, quarter-pixel precision, eighth-pixel precision or any finer precision. ME unit 35 may invoke filter(s) 39 for any necessary interpolations during the motion estimation process.

To perform fractional pixel motion compensation, MC unit 37 may perform interpolation (sometimes referred to as interpolation filtering) in order to generate data at sub-pixel resolution (referred to herein as sub-pixel or fractional pixel values). MC unit 37 may invoke filter(s) 39 for this interpolation. Prediction unit 32 may perform the interpolation (or interpolation-like filtering of integer pixels) using the techniques described herein.

Once the motion vector for the video block to be coded is selected by ME unit 35, MC unit 37 generates the prediction video block associated with that motion vector. MC unit 37 may fetch the prediction block from memory 34 based on the motion vector determined by MC unit 35. In the case of a motion vector with fractional pixel precision, MC unit 37 filters data from memory 34 to interpolate such data to sub-pixel resolution, e.g., invoking filter(s) 39 for this process. In some cases, the interpolation filtering technique or mode that was used to generate the sub-pixel prediction data may be indicated as one or more interpolation syntax elements to entropy coding unit 46 for inclusion in the coded bitstream.

Once prediction unit 32 has generated the prediction block, video encoder 50 forms a residual video block (labeled "RESID. BLOCK" in FIG. 2) by subtracting the prediction block from the original video block being coded. Adder 48 represents the component or components that perform this subtraction operation. Transform unit 38 applies a transform, such as a discrete cosine transform (DCT) or a conceptually similar transform, to the residual block, producing a video block comprising residual transform block coefficients. Transform unit 38, for example, may perform other transforms, such as those defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 quantizes the residual transform coefficients to further reduce bit rate. The quantization process may reduce the bit depth associated with some or all of the coefficients. Following quantization, entropy coding unit 46 entropy codes the quantized transform coefficients. For example, entropy coding unit 46 may perform CAVLC, CABAC, or another entropy coding methodology.

Entropy coding unit 46 may also code one or more prediction syntax elements obtained from prediction unit 32 or other component of video encoder 50. The one or more prediction syntax elements may include a coding mode, one or more motion vectors, an interpolation technique that was use to generate the sub-pixel data, a set or subset of filter coefficients, or other information associated with the generation of the prediction block. Coefficient prediction and quantization unit 41 may predictively encode and quantize the prediction syntax, such as filter coefficients, according to some aspects of this disclosure. Following the entropy coding by entropy coding unit 46, the encoded video and syntax elements may be transmitted to another device or archived for later transmission or retrieval.

Inverse quantization unit 42 and inverse transform unit 44 apply inverse quantization and inverse transformation, respectively, to reconstruct the residual block in the pixel domain, e.g., for later use as a reference block. The reconstructed residual block (labeled "RECON. RESID. BLOCK" in FIG. 2) may represent a reconstructed version of the residual block provided to transform unit 38. The reconstructed residual block may differ from the residual block generated by summer 48 due to loss of detail caused by the quantization and inverse quantization operations. Summer 51 adds the reconstructed residual block to the motion compensated prediction block produced by prediction unit 32 to produce a reconstructed video block for storage in memory 34. The reconstructed video block may be used by prediction unit 32 as a reference block that may be used to subsequently code a block in a subsequent video frame or subsequent coded unit.

As described above, prediction unit 32 may perform motion estimation with fractional pixel (or sub-pixel) precision. When prediction unit 32 uses fractional pixel motion estimation, prediction unit 32 may generate data at sub-pixel resolution (e.g., sub-pixel or fractional pixel values) using interpolation operations described in this disclosure. In other words, the interpolation operations are used to compute values at positions between the integer pixel positions. Sub-pixel positions located half the distance between integer-pixel positions may be referred to as half-pixel (half-pel) positions, sub-pixel positions located half the distance between an integer-pixel position and a half-pixel position may be referred to as quarter-pixel (quarter-pel) positions, sub-pixel positions located half the distance between an integer-pixel position (or half-pixel position) and a quarter-pixel position are referred to as eighth-pixel (eighth-pel) positions, and the like.

Figure 3:
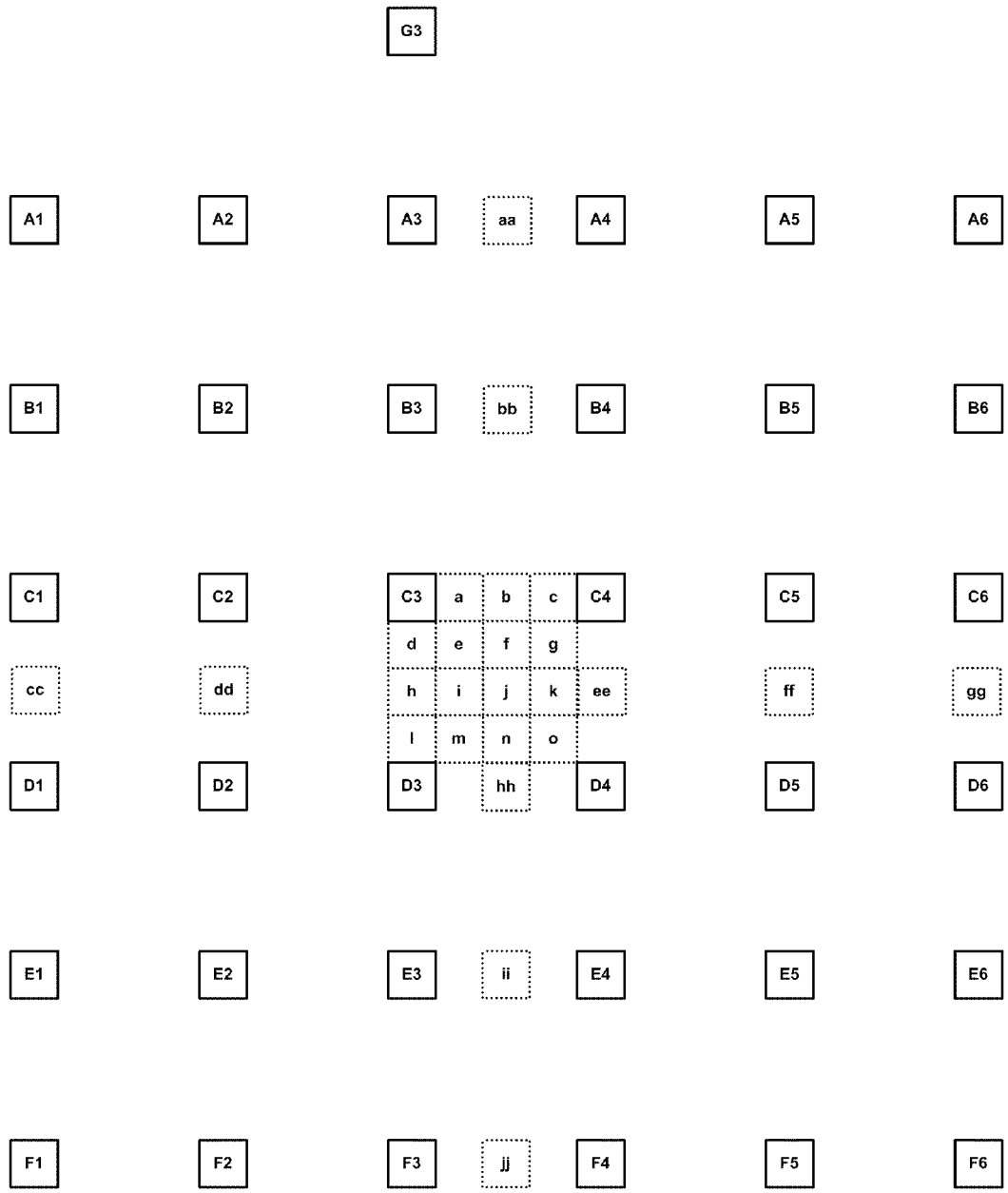
FIG. 3 is a conceptual diagram illustrating integer-pixel positions associated with prediction data, and sub-pixel positions associated with interpolated prediction data.

FIG. 3 is a conceptual diagram illustrating integer pixel (or full pixel) positions associated with prediction data, and sub-pixel (or fractional-pixel) positions associated with interpolated prediction data. In the conceptual illustration of FIG. 3, the different boxes represent pixel and sub-pixel locations or positions within a frame or a block of a frame. Capitalized letters (in the boxes with solid lines) represent integer-pixel locations, while small letters (in the boxes with dotted lines) represent the sub-pixel locations. In particular, pixel locations A1-A6, B1-B6, C1-C6, D1-D6, E1-E6 and F1-F6 represent a 6-by-6 array of integer pixel locations within a frame, slice, or other coded unit. Additional integer-pixel locations G3 and H3 are also shown in FIG. 3 to be used with examples described later in this disclosure. Sub-pixel locations "a" through "o" represent fifteen sub-pixel locations associated with integer pixel C3, e.g., between integer pixel locations C3, C4, D3 and D4. Similar sub-pixel locations may exist for every integer pixel location. The sub-pixel locations "a" through "o" represent every half-pel and quarter-pel pixel location associated with integer pixel C3.

Integer-pixel locations may be associated with a physical sensor element, such as a photodiode when the video data was originally generated. The photodiode may measure an intensity of a light source at the location of the sensor and associate a pixel intensity value with the integer-pixel location. Again, each integer-pixel location may have an associated set of fifteen sub-pixel locations (or possibly more). The number of sub-pixel locations associated with integer-pixel locations may be dependent upon the desired precision. In the example illustrated in FIG. 3, the desired precision is quarter-pixel precision, in which case, each of the integer pixel locations corresponds with fifteen different sub-pixel positions. More or fewer sub-pixel positions may be associated with each integer-pixel location based on the desired precision. For half-pixel precision, for example, each integer-pixel location may correspond with three sub-pixel positions. As another example, each of the integer-pixel locations may correspond with sixty-three sub-pixel positions for eighth-pixel precision. Each pixel location may define one or more pixel values, e.g., one or more luminance and chrominance values.

Y may represent luminance, and Cb and Cr may represent two different values of chrominance of a three-dimensional YCbCr color space. Each pixel location may actually define three pixel values for a three-dimensional color space. The techniques of this disclosure, however, may refer to prediction with respect to one dimension for purposes of simplicity. To the extent that techniques are described with respect to pixel values in one dimension, similar techniques may be extended to the other dimensions. In some cases, chrominance values are sub-sampled prior to prediction, but prediction typically occurs in the luminance space without any sub-sampling because human vision is more sensitive to pixel intensity than to pixel color.

Figure 4:
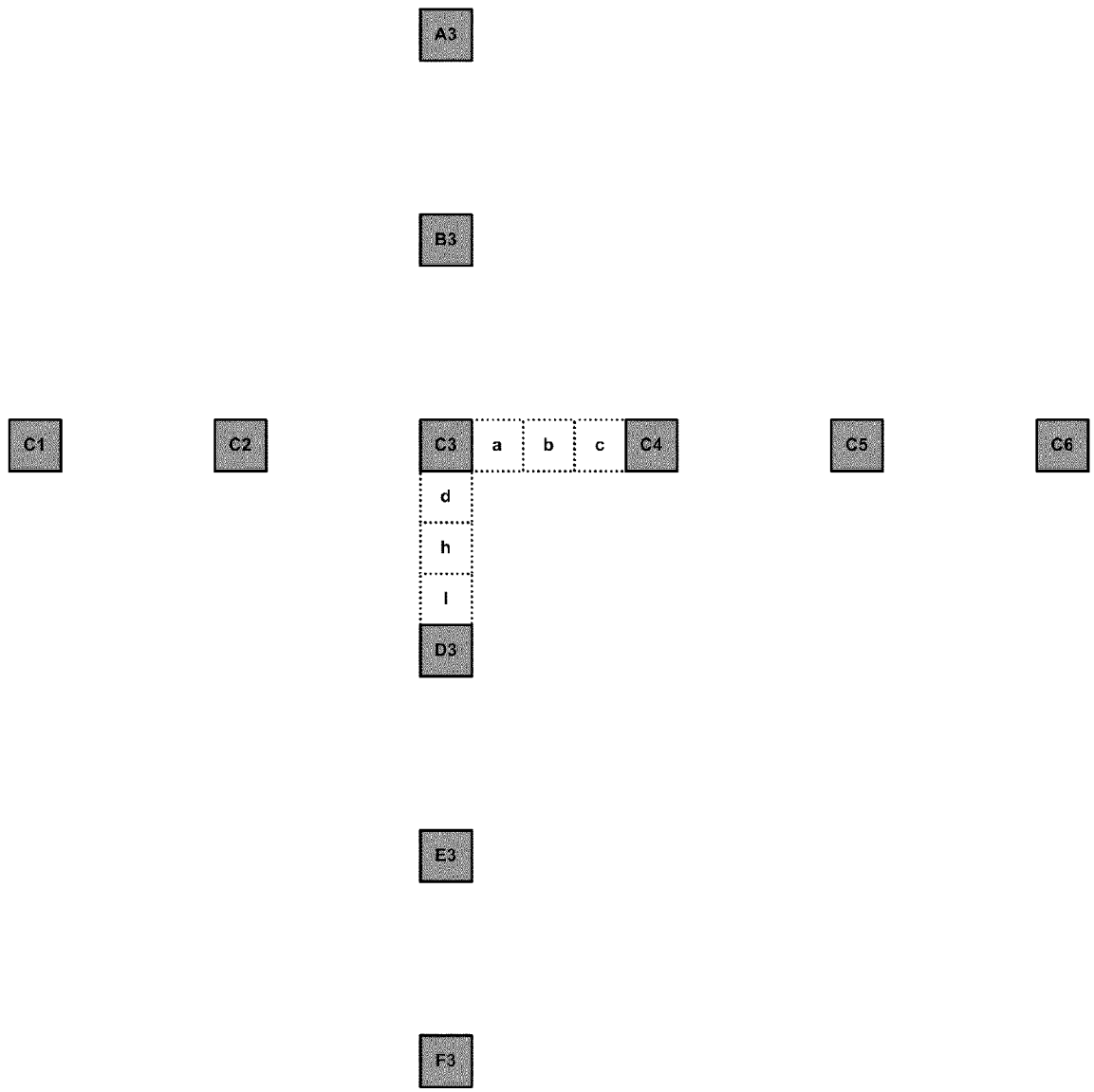
FIG. 4 is a conceptual diagram illustrating integer-pixel positions associated with prediction data, and vertical sub-pixel positions and horizontal sub-pixel positions associated with interpolated prediction data.

In the example of FIG. 3, sub-pixel locations, also referred to as sub-pixel positions, associated with integer pixel "C3" are illustrated for quarter-pixel precision. The fifteen sub-pixel positions associated with pixel C3 are labeled as "a," "b," "c," "d," "e," "f," "g," "h," "i," "j," "k," "l," "m," "n," and "o." Most of the other fractional locations associated with other integer-pixel locations are not shown for simplicity. Sub-pixel locations "b," "h" and "j" may be referred to as half-pixel locations and sub-pixel locations "a," "c," "d," "e," "f," "g," "i," "k," "l," "m," and "o" may be referred to as quarter-pixel locations. Furthermore, in this disclosure, sub-pixel positions oriented along the same horizontal axis as integer pixels can be referred to as horizontal sub-pixels. Sub-pixels "a," "b,", and "c" are examples of horizontal sub-pixels. Sub-pixels oriented on the same vertical axis as an integer pixel can be referred to as vertical sub-pixels. Sub-pixels "d," "h," and "l" are examples of vertical sub-pixels. Aspects of this disclosure include determining pixel values for horizontal sub-pixels and vertical sub-pixels using a single linear interpolation filter, and thus this disclosure may refer to horizontal sub-pixels and vertical sub-pixels collectively as 1L sub-pixels. FIG. 4 is a conceptual diagram showing the 1L sub-pixels (a, b, c, d, h, l) relative to a group of integer pixels (C1-C6, A3, B3, C3, D3, E3, and F3).

Figure 5:
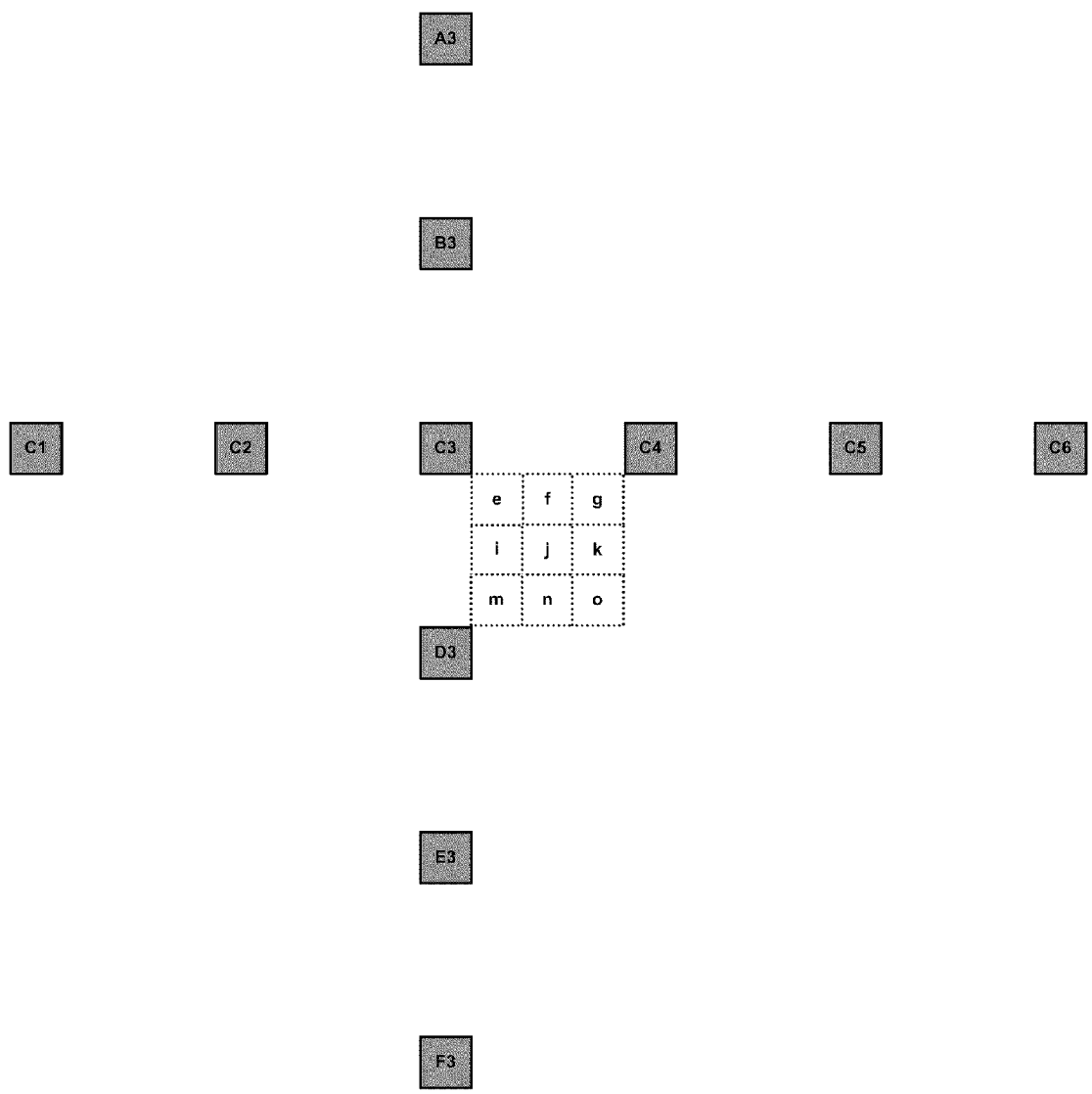
FIG. 5 is a conceptual diagram illustrating integer-pixel positions associated with prediction data, and non-vertical and non-horizontal sub-pixel 2L sub-pixel positions associated with interpolated prediction data.

Aspects of this disclosure include determining pixel values for non-vertical, non-horizontal sub-pixels, such as sub-pixels "e," "f," "g," "i," "j," "k," "m," "n," and "o," using two linear interpolation filters, one applied in the vertical direction and one applied in the horizontal direction. Accordingly, this disclosure may refer to non-vertical, non-horizontal sub-pixels, such as sub-pixels "e," "f," "g," "i," "j," "k," "m," "n," and "o," as 2L sub-pixels. FIG. 5 is a conceptual diagram showing the 2L sub-pixels (e, f, g, i, j, k, m, n, o) relative to a group of integer pixels (C1-C6, A3, B3, C3, D3, E3, and F3).

FIG. 6 is a conceptual diagram illustrating eight horizontal linear pixel support positions C0-C7 relative to a sub-pixel position "b," with shading that shows coefficient symmetry. In this case, coefficient symmetry means that only four filter coefficients are needed for C0, C1, C2 and C3 in order to define the entire set of coefficients for filter support positions C0-C7. C0 is symmetric with C7, C1 is symmetric with C6, C2 is symmetry with C5, and C3 is symmetric with C4. Thus, only four coefficients need to be communicated as part of an encoded video bitstream, or stored by filter unit 39, in order to define the set of eight coefficients needed to interpolate sub-pixel position "b." The remaining coefficients can be generated at the decoder based on the communicated coefficients. In particular, the decoder can be programmed to know that symmetry applies, and the symmetry can define how to generate any remaining coefficients based on the communicated coefficients.

FIG. 7 is a conceptual diagram illustrating eight horizontal linear pixel support positions relative to a sub-pixel, with shading that shows a lack of any coefficient symmetry. Thus, all eight coefficients are needed in order to define the set of coefficients for filter support with respect to sub-pixel position "a." However, pixel symmetry means that these same coefficients with respect to sub-pixel position "a" can also be used to derive the filter support for sub-pixel position "c." If the eight coefficients for filter support with respect to sub-position "a" are viewed as a one-dimensional array, then the eight coefficients for sub-pixel "c" can be found by flipping the array, such that the coefficient for C7 when determining a value for sub-pixel "a" can be the coefficient for C0 when determining a value for sub-pixel "c," the coefficient for C6 can be the coefficient for C1, and so on. Thus, if using adaptive interpolation filtering (AIF) for example, where the filter coefficients are computed at video encoder 22, only eight coefficients need to be communicated in the bit stream to video decoder 28 in order to define two different sets of eight coefficients needed to interpolate sub-pixel positions "a" and "c."

Figures 8, 9:
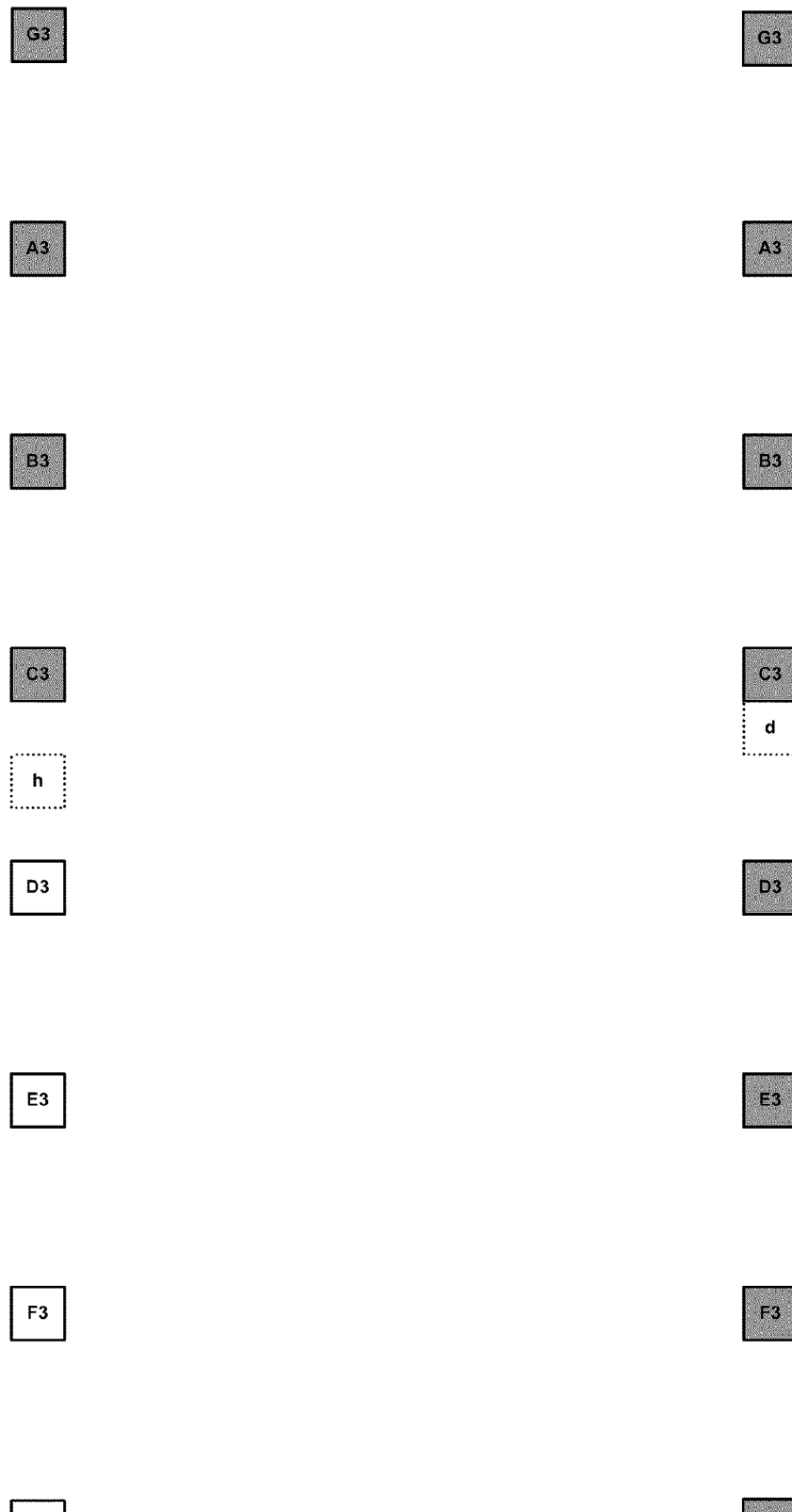
FIG. 8 is a conceptual diagram illustrating a vertical 8 pixel filter support with coefficient symmetry, relative to a sub-pixel location.
FIG. 9 is a conceptual diagram illustrating a vertical 8 pixel filter support without coefficient symmetry, relative to a sub-pixel location.

FIG. 8 is a conceptual diagram illustrating eight vertical linear pixel support positions G3, A3, B3, C3, D3, E3, F3, and H3 relative to a sub-pixel "h," with shading that shows coefficient symmetry. In this case, coefficient symmetry means that only four filter coefficients are needed for G3, A3, B3 and C3 in order to define the entire set of coefficients for filter support positions G3, A3, B3, C3, D3, E3, F3, and H3. G3 is symmetric with H3, A3 is symmetric with F3, B3 is symmetry with E3, and C3 is symmetric with D3. Due to the symmetry, the coefficient associated with G3 can also be used with H3, the coefficient associated with A3 can also used with F3, and so on. Thus, if using AIF, for example, only four coefficients need to be communicated as part of an encoded video bit-stream in order to define the set of eight coefficients needed to interpolate sub-pixel position "h."

FIG. 9 is a conceptual diagram illustrating eight vertical linear pixel support positions relative to a sub-pixel, with shading that shows a lack of any coefficient symmetry. Thus, all eight coefficients are needed in order to define the set of coefficients for filter support with respect to sub-pixel position "d." As noted above with respect to FIG. 7, however, pixel symmetry means that these same coefficients with respect to sub-pixel position "d" can also be used to derive the filter support for sub-pixel position "l." Thus, if using AIF, for example, only eight coefficients need to be communicated in the bit stream to video decoder 28 in order to define two different sets of eight coefficients needed to interpolate sub-pixel positions "d" and "l."

Prediction unit 32 of video encoder 40 may determine pixel values for sub-pixel locations "a" through "o" using interpolation filtering by filtering unit 39. For half-pixel positions "b" and "h," each filter coefficient, also called a tap, may correspond to an integer pixel position in the horizontal and vertical direction, respectively. In particular, for half-pixel position "b," the taps of the 8-tap filter correspond to C0, C1, C2, C3, C4, C5, C6, and C7. Sub-pixel positions C0 and C7 are not shown in FIG. 3 but can be seen, for example, in FIGS. 6 and 7. Likewise, for half-pixel position "h," the taps of the 8-tap filter correspond to G3, A3, B3, C3, D3, E3, F3, and H3. For example, pixel values for sub-pixel positions "b" and "h" may be computed using equations (1) and (2):

$$b=((-3*C0+12*C1-39*C2+158*C3+158*C4-39*C5+12*C6-3*C7)+128)/256 \quad (1)$$

$$h=((-3*G3+12*A3-9*B3+158*C3+158*D3-39*E3+12*F3-3*H3)+128)/256 \quad (2)$$

In some implementations, the division by 256 can be implemented by a right shift of 8 bits. As with position "b," for quarter-pixel positions "a" and "c," the taps of the 8-tap filter may correspond to C0, C1, C2, C3, C4, C5, C6, and C7, but unlike for position "b," the filter coefficients might be non-symmetric and different than for position "b." For example, pixel values for sub-pixel positions "a" and "c" may be computed using equations (3) and (4):

$$a=((-3*C0+12*C1-37*C2+229*C3+71*C4-21*C5+6*C6-C7)+128)/256 \quad (3)$$

$$c=((-C0+6*C1-21*C2+71*C3+229*C4-37*C5+12*C6-3*C7)+128)/256 \quad (4)$$

In some implementations, the division by 256 can be implemented by a right shift of 8 bits. As with position "h," for quarter-pixel positions "d" and "l," the taps of the 8-tap filter may correspond to G3, A3, B3, C3, D3, E3, F3, and H3, but unlike for position "h," the filter coefficients might be non-symmetric and different than for position "h." For example, pixel values for sub-pixel positions "d" and "l" may be computed using equations (5) and (6):

$$d=((-3*G3+12*A3-37*B3+229*C3+71*D3-21*E3+6*F3-H3)+128)/256 \quad (5)$$

$$l=((-G3+6*A3-21*B3+71*C3+229*D3-37*E3+12*F3-3*H3)+128)/256 \quad (6)$$

In some implementations, the division by 256 can be implemented by a right shift of 8 bits. Although the example coefficients given for equations (1)-(6) above generally use the same coefficients for both horizontal sub-pixels and vertical sub-pixels, it is not required that the coefficients for horizontal and vertical sub-pixels be the same. For example, equations (1) and (2), (3) and (5), and (4) and (6), respectively have the same coefficients in the examples above, but in some implementations, each may have different coefficients.

Prediction unit 32 of video encoder 40 may also determine pixel values for 2L sub-pixel locations "e," "f," "g," "i," "j," "k," "m," "n," and "o," using interpolation filtering by filtering unit 39. For the 2L sub-pixel positions, a horizontal filtering is followed by a vertical filtering, or vice versa. The first filtering operation determines intermediate values, and the second filtering operation utilizes the intermediate values to determine a pixel value for the sub-pixel location. For example, to determine a value for "j," 6-tap horizontal filters can be used to determine the intermediate values for "aa," "bb," "b," "hh," "ii," and "jj," using the following equations:

$$aa=((8*A1-40*A2+160*A3+160*A4-40*A5+8*A6)+128)/256 \quad (7)$$

$$bb=((8*B1-40*B2+160*B3+160*B4-40*B5+8*B6)+128)/256 \quad (8)$$

$$b=((8*C1-40*C2+160*C3+160*C4-40*C5+8*C6)+128)/256 \quad (9)$$

$$hh=((8*D1-40*D2+160*D3+160*D4-40*D5+8*D6)+128)/256 \quad (10)$$

$$ii=((8*E1-40*E2+160*E3+160*E4-40*E5+8*E6)+128)/256 \quad (11)$$

$$jj=((8*F1-40*F2+160*F3+160*F4-40*F5+8*F6)+128)/ \quad (12)$$

In some implementations, the division by 256 can be implemented by a right shift of 8 bits. Applying a 6-tap vertical filter to the intermediate values above, the value for "j" can be determined using the following equation:

$$j=((8*aa-40*bb+160*c3+160*hh-40*ii+8*jj)+128)/256. \quad (13)$$

In some implementations, the division by 256 can be implemented by a right shift of 8 bits. Alternatively, 6-tap vertical filters can be used to find intermediate values for "cc," "dd," "h," "ee," "ff," and "gg," and a 6-tap horizontal can be applied to those intermediate values to determine a pixel value for "j."

Similar to the procedure described above for sub-pixel "j,", pixel values for sub-pixel locations "e," "f," "g," "i," "k," "m," "n," and "o" can be determined by first performing a vertical filtering operation to determine intermediate values and then applying a 6-tap horizontal filter to the intermediate values determined by the vertical filtering, or by first performing a horizontal filtering operation to determine intermediate values and then applying a 6-tap vertical filter to the intermediate values determined by the horizontal filtering. While both the horizontal and vertical filters used as examples above for sub-pixel "j" use symmetrical coefficients, one or both of the horizontal or vertical filters used to determine pixel values for the other 2D sub-pixel values may not be symmetrical. For example, in one exemplary implementation, both the horizontal and vertical filters for sub-pixel locations "e," "g," "m," and "o" might use non-symmetrical coefficients. Sub-pixel locations "f" and "n" may use a horizontal filter with symmetrical coefficients and a vertical filter with non-symmetrical coefficients, and sub-pixel locations "i" and "k" may use a horizontal filter with non-symmetrical coefficients and a vertical filter with symmetrical filter coefficients.

The actual filters applied by filtering unit 39 to generate interpolated data at the sub-pixel locations may be subject to a wide variety of implementations. As one example, prediction unit 32 may utilize AIF, where the filter coefficients are computed by video encoder 22 and transmitted in the bit stream to video decoder 28. As another example, prediction unit 32 may utilize switched filtering, where multiple filters are known by both video encoder 22 and video decoder 28, and the particular filter to be used is signaled from video encoder 22 to video decoder 28 in the bit stream. In an example of switched filtering, video encoder 22 and video decoder 28 might store four unique filters for each sub-pixel position, and the particular filter to be used for a sub-pixel position can be signaled from video encoder 22 to video decoder 28 using two bits.

Prediction unit 32 may use separable interpolation filters in the horizontal direction and in the vertical direction. For the 1L sub-pixel positions, prediction unit 32 (e.g., MC unit 37 of prediction unit 32) applies only horizontal directional filters or only vertical directional filters depending on the sub-pixel location. In one example, the horizontal and vertical directional filters comprise 8-position (or 8-tap) filters. Prediction unit 32 applies horizontal directional filters for sub-pixel positions "a," "b," and "c" with integer-pixel positions C0, C1, C2, C3, C4, C5, C6, and C7 (C0 and C7 not shown at FIG. 3) as filter support and applies vertical directional filters for sub-pixel positions "d," "h," and "l" with integer-pixel positions G3, A3, B3, C3, D3, E3, F3, and H3 (see FIG. 3) as filter support. For the remaining sub-pixel positions, i.e., the 2L sub-pixel positions, prediction unit 32 applies horizontal filtering first, followed by vertical filtering or vertical filtering first, followed by horizontal filtering. The horizontal and vertical filters used for the 2L sub-pixel positions might each be a 6-tap filter.

Although this disclosure uses 8-tap filters and 6-tap filters as examples, it is important to note that other filter lengths can also be used and are within the scope of this disclosure. For example, 6-tap filters might be used for determining values for the 1L sub-pixel locations while 4-tap filters are used for determining values for the 2L sub-pixel locations, or 10-tap filters might be used for determining values for the 1L sub-pixel locations while 8-tap filters or 6-tap filters are used for determining values for the 2L sub-pixel locations.

Figure 10:
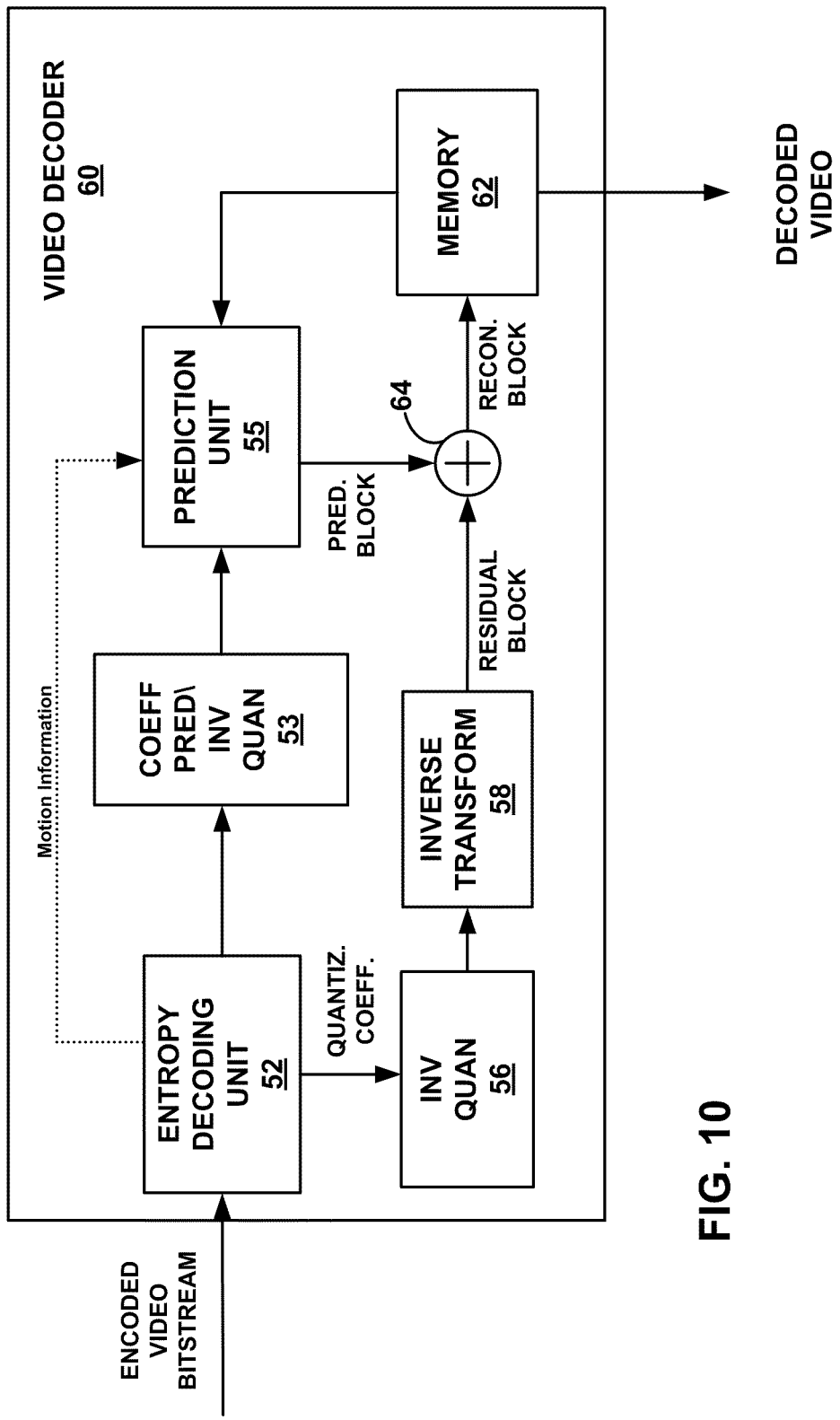
FIG. 10 is a block diagram illustrating an example of a video decoder, which may decode a video sequence that is encoded in the manner described herein.

FIG. 10 is a block diagram illustrating an example of a video decoder, which may decode a video sequence that is encoded in the manner described herein. Video decoder 60 is one example of a specialized video computer device or apparatus referred to herein as a "coder." Video decoder 60 includes an entropy decoding unit 52 that entropy decodes the received bitstream to generate quantized coefficients and the prediction syntax elements. The prediction syntax elements may include a coding mode, one or more motion vectors, information identifying an interpolation technique use to generate the sub-pixel data, coefficients for use in interpolation filtering, and/or other information associated with the generation of the prediction block.

The prediction syntax elements, e.g., the coefficients, are forwarded to prediction unit 55. If prediction is used to code the coefficients relative to coefficients of a fixed filter, or relative to one another, coefficient prediction and inverse quantization unit 53 can decode the syntax elements to define the actual coefficients. Also, if quantization is applied to any of the prediction syntax, coefficient prediction and inverse quantization unit 53 can also remove such quantization. Filter coefficients, for example, may be predictively coded and quantized according to this disclosure, and in this case, coefficient prediction and inverse quantization unit 53 can be used by video decoder 60 to predictively decode and de-quantize such coefficients.

Prediction unit 55 may generate prediction data based on the prediction syntax elements and one or more previously decoded blocks that are stored in memory 62, in much the same way as described in detail above with respect to prediction unit 32 of video encoder 50. In particular, prediction unit 55 may perform one or more of the interpolation filtering techniques of this disclosure during motion compensation to generate a prediction block with a particular precision, such as quarter-pixel precision. As such, one or more of the techniques of this disclosure may be used by video decoder 60 in generating a prediction block. Prediction unit 55 may include a motion compensation unit that comprises filters used for interpolation and interpolation-like filtering techniques of this disclosure. The motion compensation component is not shown in FIG. 10 for simplicity and ease of illustration.

Inverse quantization unit 56 inverse quantizes, i.e., de-quantizes, the quantized coefficients. The inverse quantization process may be a process defined for H.264 decoding. Inverse transform unit 58 applies an inverse transform, e.g., an inverse DCT or conceptually similar inverse transform process, to the transform coefficients in order to produce residual blocks in the pixel domain. Summer 64 sums the residual block with the corresponding prediction block generated by prediction unit 55 to form a reconstructed version of the original block encoded by video encoder 50. If desired, a deblocking filter may also be applied to filter the decoded blocks in order to remove blockiness artifacts. The decoded video blocks are then stored in reference frame store 62, which provides reference blocks for subsequent motion compensation and also produces decoded video to drive display device (such as device 28 of FIG. 1).

Figure 11:
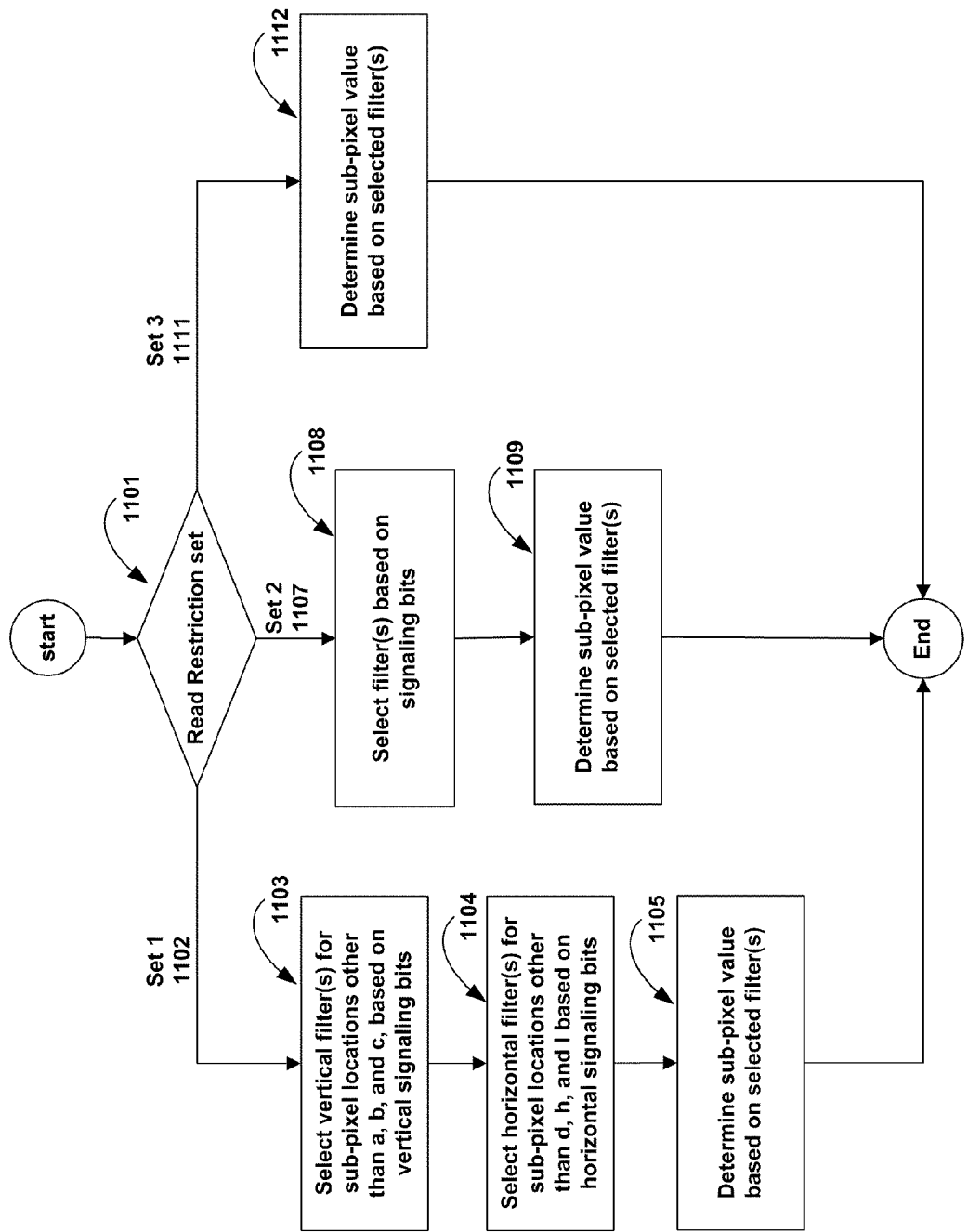
FIG. 11 is a flow diagram for illustrating techniques for filter signaling consistent with the present disclosure.

The particular interpolation filter used by prediction unit 55 can be determined based on the prediction syntax elements received in the encoded video bit stream from source device 12, for example. FIG. 11 shows a method for determining interpolation filters based on syntax elements received in the bit stream. The method of FIG. 11 may, for example, be used to determine filters for sub-pixel locations of P slices. Video decoder 60 receives an encoded bit stream from source device 12. From syntax elements of a coding unit, such as syntax elements within a frame header or a slice header, prediction unit 55 reads bits identifying a restriction set (1101). The restriction set identifies to prediction unit 55, which set of filter indexes to use for the sub-pixel locations of that coding unit. Each sub-pixel location may have its own filter index, or a group of sub-pixel locations may share a filter index. The filter index associates a particular filter with a particular pattern of bits. For example, if using two bits per sub-pixel location to signal a filter selection, the bit pattern 00 might correspond to a first filter, 01 to a second filter, 10 to a third filter, and 11 to a fourth filter. As each sub-pixel location may have its own unique filter index and unique filters, the bit pattern 00 may correspond to a different filter for sub-pixel location "j," for example, than it does for sub-pixel location "e," for example.

The example of FIG. 11 uses three restriction sets. If the header of a coded unit contains a signal to prediction unit 55 that the first restriction set is to be used (1102), then for all sub-pixel values determined for the coded unit, both the horizontal and vertical filters for each sub-pixel value can be signaled separately using vertical signaling bits and horizontal signaling bits. Thus, if using two bits each for the vertical signaling bits and the horizontal signaling bits, the filters for the 1L sub-pixel positions are signaled using two bits total, and the filters for the 2L positions are signaled using four bits total, two for the vertical signaling bits and two for the horizontal signaling bits.

For sub-pixel locations other than locations "a," "b," and "c," two vertical signaling bits in the bit stream can identify one of four vertical filters to be used (1103). For locations "a," "b," and "c" no vertical signaling bits may be present in the bit stream, and no vertical filter may be selected. In accordance with this disclosure, the vertical filters selected for sub-pixel locations "d," "h," and "l" can be longer than the vertical filters selected for "e," "f," "g," "i," "j," "k," "m," "n," and "o." For example, the vertical filters selected for sub-pixel locations "d," "h," and "l" may comprise 8-tap filters, while the vertical filters for selected for sub-pixel locations "e," "f," "g," "i," "j," "k," "m," "n," and "o" may comprise 6-tap filters.

For sub-pixel locations other than locations "d," "h," and "l," two horizontal signaling bits may identify one of four horizontal filters to be used (1104). For locations "d," "h," and "l" no horizontal signaling bits may be present in the bit stream, and no horizontal filter may be selected. In accordance with this disclosure, the horizontal filters selected for sub-pixel locations "a," "b," and "c" can be longer than the horizontal filters selected for "e," "f," "g," "i," "j," "k," "m," "n," and "o." For example, the horizontal filters selected for sub-pixel locations "a," "b," and "c" may comprise 8-tap filters, while the horizontal filters for selected for sub-pixel locations "e," "f," "g," "i," "j," "k," "m," "n," and "o" may comprise 6-tap filters.

Once the horizontal filter and vertical filter are selected, the filters can be used, as described above, to determine a value for the sub-pixel location. If a sub-pixel is located at location "a," "b," or "c," then a single horizontal filter can be used to determine the sub-pixel value, as described above in relation to equations 1, 3, and 4. If the sub-pixel is located at "d," "h," or "l," then a single vertical filter can be used to determine the sub-pixel value, as described above in relation to equations 2, 5, and 6. If the sub-pixel is located at "e," "f," "g," "i," "j," "k," "m," "n," or "o," then both a vertical filter and a horizontal filter can be used to determine a value for the sub-pixel location, as described above in relation to equations 7-13.

If the header of a coded unit contains a signal to prediction unit 55 that the second restriction set is to be used (1107), then for all sub-pixel values determined for the coded unit, both the horizontal and vertical filters for each sub-pixel value can be signaled together using two signaling bits per sub-pixel location. Based on the signaling bits, a filter or pair of filters can be selected (1108). For sub-pixel locations "a," "b," or "c," the two signaling bits can be used to identify one of four horizontal filters associated with that particular sub-pixel location. For the sub-pixel locations "d," "h," or "l," the two signaling bits can be used to identify one of four vertical filters associated with that particular sub-pixel location. For sub-pixel locations at "e," "f," "g," "i," "j," "k," "m," "n," or "o," the two signaling bits can be used to identify one of four pairs of horizontal and vertical filters. Thus, while restriction set 1 enabled two horizontal signaling bits to identify one of four horizontal filters and enabled two vertical signaling bits to identify one of four vertical filters for a total of sixteen horizontal-vertical combinations, restriction set 2 only allows for four horizontal-vertical combinations. Restriction set 2, however, reduces the total number of bits needed to signal a filter selection. Based on the filter or combination of filters identified by the signaling bits, a value for the sub-pixel location is determined in a similar manner as described above (1109). If the header of a coded unit contains a signal to prediction unit 55 that the third restriction set is to be used (1111), then for all sub-pixel values determined for the coded unit, a fixed filter or combination of filters can be used only based on the sub-pixel location and not based on any signaling bits associated with the sub-pixel location (1112). For example, unlike with restriction sets 1 and 2 where sub-pixel locations "a," "b," and "c," can each have four possible corresponding horizontal filters, with restriction set 3, sub-pixel locations "a," "b," and "c," each have one corresponding horizontal filter. Unlike with restriction sets 1 and 2 where sub-pixel locations "d," "h," and "l," can each have four possible corresponding vertical filters, with restriction set 3, sub-pixel locations "d," "h," or "l," each have one corresponding vertical filter. Unlike with restriction sets 1 and 2 where sub-pixel locations "e," "f," "g," "i," "j," "k," "m," "n," or "o," each have 16 and 4 possible horizontal-vertical filter combinations respectively, with restriction set 3, sub-pixel locations "e," "f," "g," "i," "j," "k," "m," "n," or "o," each have a single horizontal-vertical filter combination. While restriction set 3 may reduce available filters, restriction set 3 also may reduce the total number of bits needed to signal a filter selection.

Figure 12:
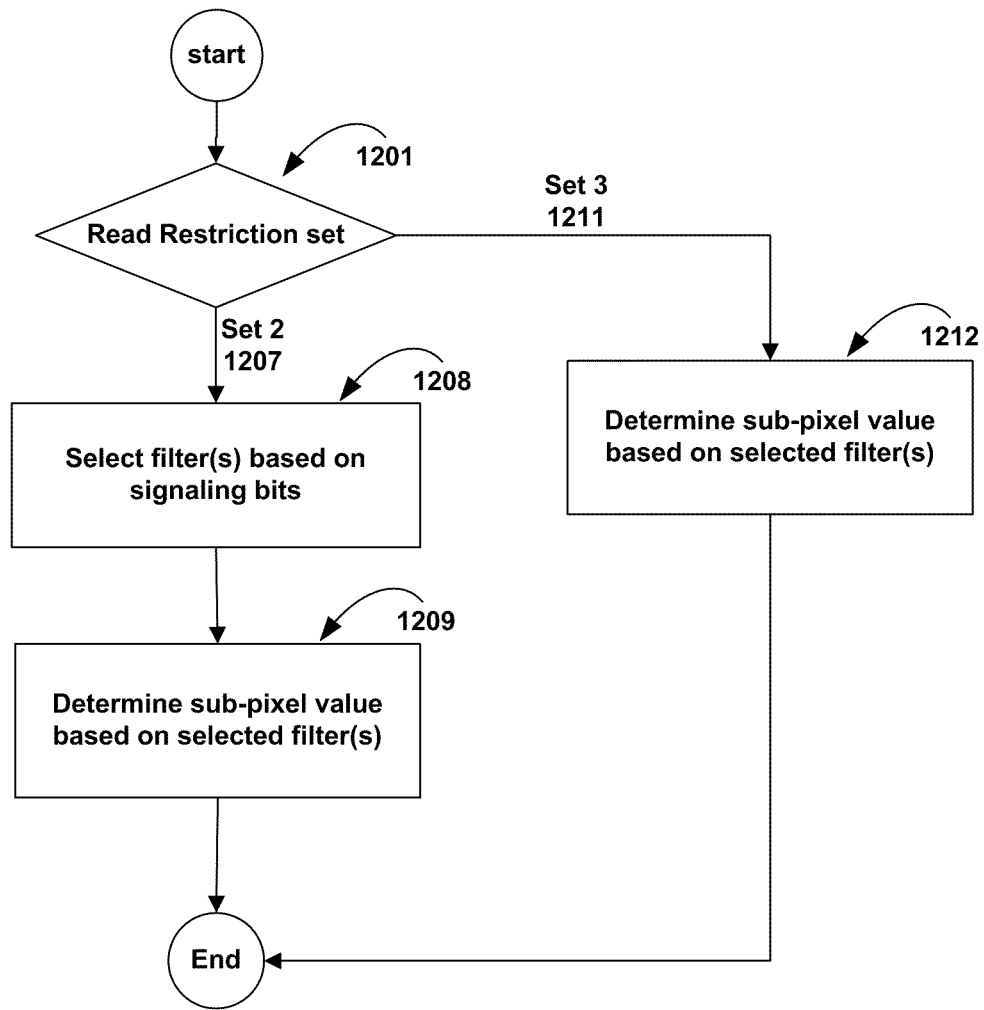
FIG. 12 is a flow diagram for illustrating techniques for filter signaling consistent with the present disclosure.

FIG. 12 shows a method for determining interpolation filters based on syntax elements received in the bit stream. The method of FIG. 12 may, for example, be used to determine filters for sub-pixel locations of B slices. Unlike FIG. 11 which includes three restriction sets for P slices, the example of FIG. 12 only includes two restriction sets. Restriction set 1, as described relative to FIG. 11, may be excluded when using B slices in order to improve coding efficiency. B slices are typically encoded with fewer bits than P slices. Using the same restriction sets for P and B slices, may result in using the same number of bits to signal the choice of interpolation filters for each fractional pixel position, but the overhead of signaling the interpolation filters, as a percentage of the overall bits, might be much higher for B slices than for P slices. Due to this higher overhead, in the case of B slices, the rate-distortion trade-off may not be as favorable as with P slices. Therefore, in some implementations, restriction set 1 may not be used for B slices.

If the header of a coded unit contains a signal to prediction unit 55 that the second restriction set is to be used (1207) for a B slice, then for all sub-pixel values determined for the coded unit, both the horizontal and vertical filters for each sub-pixel value can be signaled together using two signaling bits per sub-pixel location. Based on the signaling bits, a filter or pair of filters can be selected (1208). For sub-pixel locations "a," "b," or "c," the two signaling bits can be used to identify one of four horizontal filters associated with that particular sub-pixel location. For the sub-pixel locations "d," "h," or "l," the two signaling bits can be used to identify one of four vertical filters associated with that particular sub-pixel location. For sub-pixel locations at "e," "f," "g," "i," "j," "k," "m," "n," or "o," the two signaling bits can be used to identify one of four pairs of horizontal and vertical filters. Based on the filter or combination of filters identified by the signaling bits, a value for the sub-pixel location is determined in a similar manner as described above (1209). If the header of a coded unit contains a signal to prediction unit 55 that the third restriction set is to be used (1211), then for all sub-pixel values determined for the coded unit, a fixed filter or combination of filters can be used only based on the sub-pixel location and not based on any signaling bits associated with the sub-pixel location (1212). For example, unlike with restriction sets 2 where sub-pixel locations "a," "b," and "c," can each have four possible corresponding horizontal filters, with restriction set 3, sub-pixel locations "a," "b," and "c," each have one corresponding horizontal filter. Unlike with restriction set 2 where sub-pixel locations "d," "h," and "l," can each have four possible corresponding vertical filters, with restriction set 3, sub-pixel locations "d," "h," or "l," each have one corresponding vertical filter. Unlike with restriction set 2 where sub-pixel locations "e," "f," "g," "i," "j," "k," "m," "n," or "o," each 4 possible horizontal-vertical filter combinations respectively, with restriction set 3, sub-pixel locations "e," "f," "g," "i," "j," "k," "m," "n," or "o," each have a single horizontal-vertical filter combination. While restriction set 3 might reduce available filters compared to restriction set 2, it also reduces the total number of bits needed to signal a filter selection.

Figure 13:
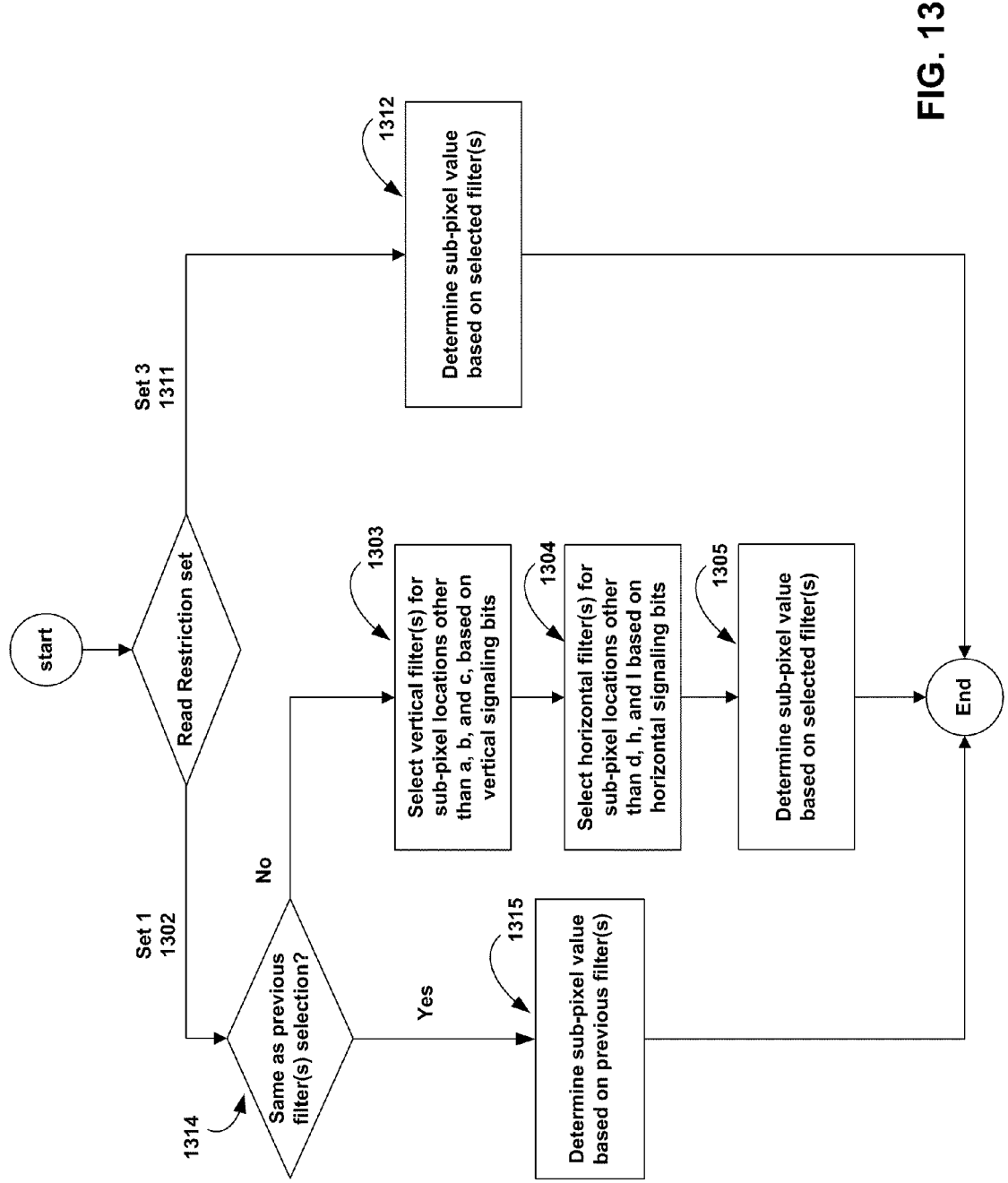
FIG. 13 is a flow diagram for illustrating techniques for filter signaling consistent with the present disclosure.

FIG. 13 is a flow diagram illustrating a method for determining interpolation filters based on syntax elements received in the bit stream. The method of FIG. 13 is a modification of the method described for P slices relative to FIG. 11. If the header of a coded unit contains a signal to prediction unit 55 that the first restriction set can be used (1302), then for all sub-pixel values determined for the coded unit, a flag can also be transmitted in the bit stream. The flag is a 1 bit signal telling the prediction unit 55 to either use the same filter selection previously used for that sub-pixel location or to use a different filter. If the flag indicates the previous filter should be used (1314, yes) for a particular sub-pixel location, then the horizontal filter, vertical filter, or combination of horizontal and vertical filters most recently used for that particular sub-pixel location can be used again to determine a value for the particular sub pixel location (1315). If the flag indicates the same filter should be used, then the two or four bits otherwise used to signal the horizontal and/or vertical filters do not need to be transmitted, resulting in a reduction in bits transmitted. If, however, the flag indicates a different filter should be used (1314, no) for the particular sub-pixel location, then both the horizontal and vertical filters for the sub-pixel location can be signaled separately, as described above relative to FIG. 11, using vertical signaling bits and horizontal signaling bits.

For sub-pixel locations other than locations "a," "b," and "c," two vertical signaling bits in the bit stream can identify one of four vertical filters to be used (1303). For locations "a," "b," and "c" no vertical signaling bits may be present in the bit stream, and no vertical filter can be selected. In accordance with this disclosure, the vertical filters selected for sub-pixel locations "d," "h," and "l" can be longer than the vertical filters selected for "e," "f," "g," "i," "j," "k," "m," "n," and "o." For example, the vertical filters selected for sub-pixel locations "d," "h," and "l" may comprise 8-tap filters, while the vertical filters for selected for sub-pixel locations "e," "f," "g," "i," "j," "k," "m," "n," and "o" may comprise 6-tap filters.

For sub-pixel locations other than locations "d," "h," and "l," two horizontal signaling bits can identify one of four horizontal filters to be used (1304). For locations "d," "h," and "l" no horizontal signaling bits may be present in the bit stream, and no horizontal filter is selected. In accordance with this disclosure, the horizontal filters selected for sub-pixel locations "a," "b," and "c" can be longer than the horizontal filters selected for "e," "f," "g," "i," "j," "k," "m," "n," and "o." For example, the horizontal filters selected for sub-pixel locations "a," "b," and "c" may comprise be 8-tap filters, while the horizontal filters for selected for sub-pixel locations "e," "f," "g," "i," "j," "k," "m," "n," and "o" may comprise 6-tap filters.

Once the horizontal filter and vertical filter are selected, the filters can be applied, as described above, to determine a value for the sub-pixel location. If a sub-pixel is located at location "a," "b," or "c," then a single horizontal filter can be used to determine the sub-pixel value. If the sub-pixel is located at "d," "h," or "l," then a single vertical filter can be used to determine the sub-pixel value. If the sub-pixel is located at "e," "f," "g," "i," "j," "k," "m," "n," or "o," then both a vertical filter and a horizontal filter can be used to determine a value for the sub-pixel location.

If the header of a coded unit contains a signal to prediction unit 55 that the third restriction set can be used (1311), then for all sub-pixel values determined for the coded unit, a fixed filter or combination of filters can be selected based only on the sub-pixel location and not based on any signaling bits associated with the sub-pixel location (1312). For example, unlike with restriction sets 1 and 2 where sub-pixel locations "a," "b," and "c," can each have four possible corresponding horizontal filters, with restriction set 3, sub-pixel locations "a," "b," and "c," each have one corresponding horizontal filter. Unlike with restriction sets 1 and 2 where sub-pixel locations "d," "h," and "l," can each have four possible corresponding vertical filters, with restriction set 3, sub-pixel locations "d," "h," or "l," each have one corresponding vertical filter. Unlike with restriction set 1 where sub-pixel locations "e," "f," "g," "i," "j," "k," "m," "n," or "o," each have 16 and 4 possible horizontal-vertical filter combinations respectively, with restriction set 3, sub-pixel locations "e," "f," "g," "i," "j," "k," "m," "n," or "o," each have a single horizontal-vertical filter combination. While restriction set 3 might reduce available filters, it also reduces the total number of bits needed to signal a filter selection.

Figure 14:
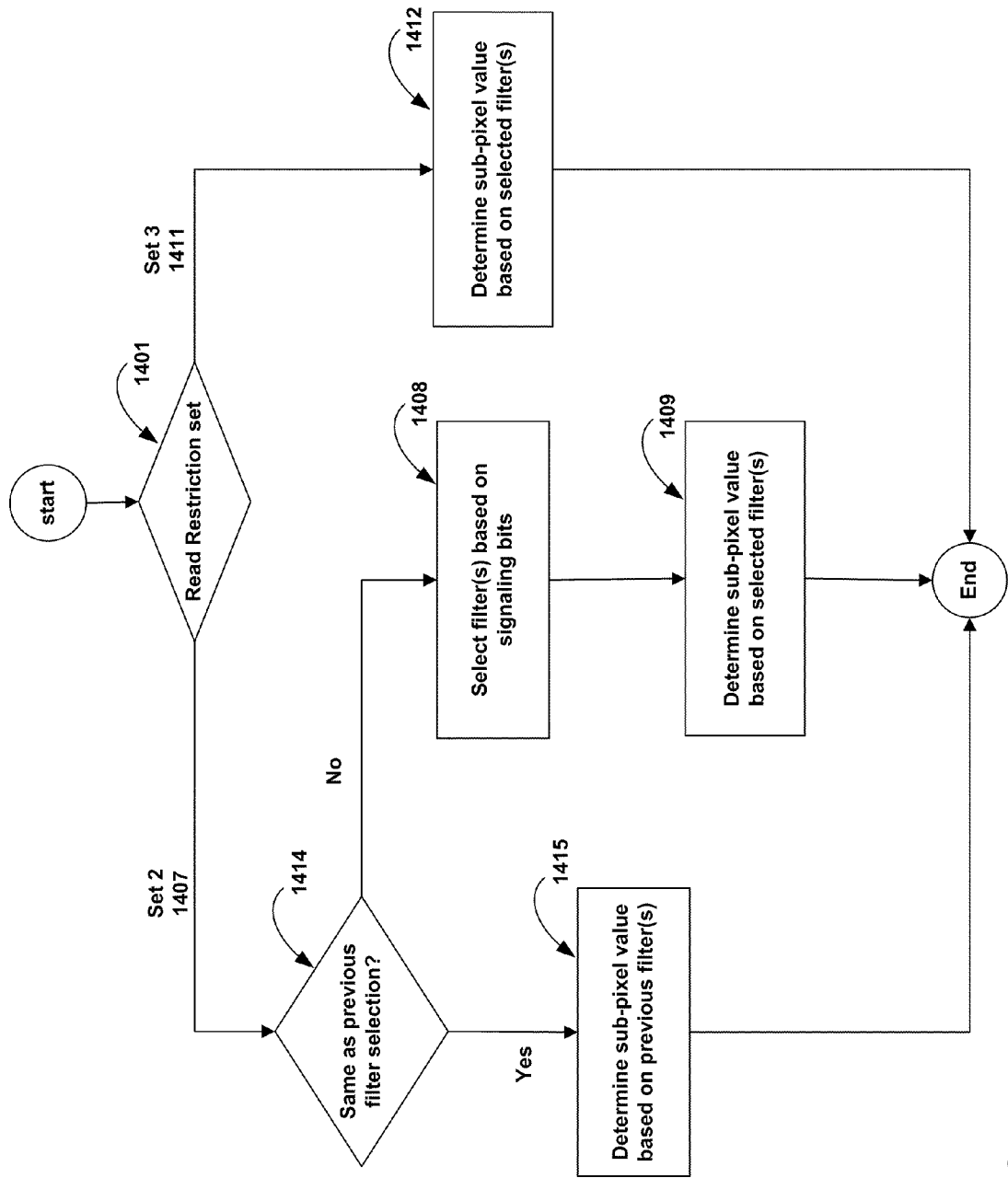
FIG. 14 is a flow diagram for illustrating techniques for filter signaling consistent with the present disclosure.

FIG. 14 is a flow diagram illustrating a method for determining interpolation filters based on syntax elements received in the bit stream. The method of FIG. 14 may comprise a modification of the method described for B slices relative to FIG. 12. If the header of a coded unit contains a signal to prediction unit 55 that the second restriction set can be used (1407), then for all sub-pixel values determined for the coded unit, a flag can be transmitted in the bit stream. The flag is a 1 bit signal telling the prediction unit 55 to either use the same filter selection previously used for that sub-pixel location or to use a different filter. If the flag indicates the previous filter should be used (1414, yes) for a particular sub-pixel location, then the horizontal filter, vertical filter, or combination of horizontal and vertical filters most recently used for that particular sub-pixel location can be used again to determine a value for the particular sub pixel location (1415). If, however, the flag indicates a different filter should be used (1414, no) for the particular sub-pixel location, then both the horizontal and vertical filters for the sub-pixel location can be signaled, as described above relative to FIG. 12, using signaling bits.

Based on the signaling bits, a filter or pair of filters can be selected (1408). For sub-pixel locations "a," "b," or "c," the two signaling bits can be used to identify one of four horizontal filters associated with that particular sub-pixel location. For the sub-pixel locations "d," "h," or "l," the two signaling bits can be used to identify one of four vertical filters associated with that particular sub-pixel location. For sub-pixel locations at "e," "f," "g," "i," "j," "k," "m," "n," or "o," the two signaling bits can be used to identify one of four pairs of horizontal and vertical filters. Based on the filter or combination of filters identified by the signaling bits, a value for the sub-pixel location is determined in a similar manner as described above (1409).

If the header of a coded unit contains a signal to prediction unit 55 that the third restriction set can be used (1411), then for all sub-pixel values determined for the coded unit, a fixed filter or combination of filters can be used only based on the sub-pixel location and not based on any signaling bits associated with the sub-pixel location (1412). For example, unlike with restriction sets 2 where sub-pixel locations "a," "b," and "c," can each have four possible corresponding horizontal filters, with restriction set 3, sub-pixel locations "a," "b," and "c," each have one corresponding horizontal filter. Unlike with restriction set 2 where sub-pixel locations "d," "h," and "l," can each have four possible corresponding vertical filters, with restriction set 3, sub-pixel locations "d," "h," or "l," each have one corresponding vertical filter. Unlike with restriction set 2 where sub-pixel locations "e," "f," "g," "i," "j," "k," "m," "n," or "o," each 4 possible horizontal-vertical filter combinations respectively, with restriction set 3, sub-pixel locations "e," "f," "g," "i," "j," "k," "m," "n," or "o," each have a single horizontal-vertical filter combination. While restriction set 3 might reduce available filters compared to restriction set 2, it also reduces the total number of bits needed to signal a filter selection.

In accordance with this disclosure, in the examples of FIGS. 11, 12, 13, and 14, the horizontal filters selected for sub-pixel locations "a," "b," and "c" and the vertical filters selected for sub-pixel locations "d," "h," and "l," can be longer than the horizontal and vertical filters selected for "e," "f," "g," "i," "j," "k," "m," "n," and "o." Furthermore, although the examples of FIGS. 11, 12, 13, and 14 generally discussing using two signaling bits to select one of four filters, more or fewer signaling bits may also be used. For example, one signaling bit might be used to select one of two filter, or three signaling bits might be used to select one of eight possible filters.

While this disclosure has generally described techniques for using longer filters for 1L positions and shorter filters for 2L positions based on quarter-pixel motion vector precision, the techniques of this disclosure may also be applied to other motion vector precisions such as one-eighth pixel and half-pixel precision. For example, when using one-eighth pixel precision, there might be 7 horizontal and 7 vertical pixel positions (i.e. 14 1L positions) and 49 2L positions.

Additionally, in some implementations, motion vector precision may adaptively be switched during coding, such as between quarter-pixel precision and one-eighth pixel precision. In such an implementation, the techniques of the present disclosure may be applied at both the quarter-pixel locations and the one-eighth pixel locations. In other implementations, the techniques of this disclosure may, for example, only be applied to the quarter-pixel locations, while different filter selection techniques, such as using fixed, non-switchable filters, are used at the one-eighth pixel locations. In the example where fixed, non-switchable filters are used for one-eighth pixel locations, a filter choice might be signaled to the decoder for the quarter-pixel locations but not for the one-eighth pixel positions.

Additionally, although the examples of FIGS. 11-14 and other examples in this disclosure have generally described using separable filters for the 2L positions, it is contemplated that in some implementations the signaling bits for the 2L positions could be used to identify one or more non-separable filters. As an example, the two signaling bits described above for restriction set 2 could be used to select between four filters that include two non-separable filters and two separable filters.

Figure 15:
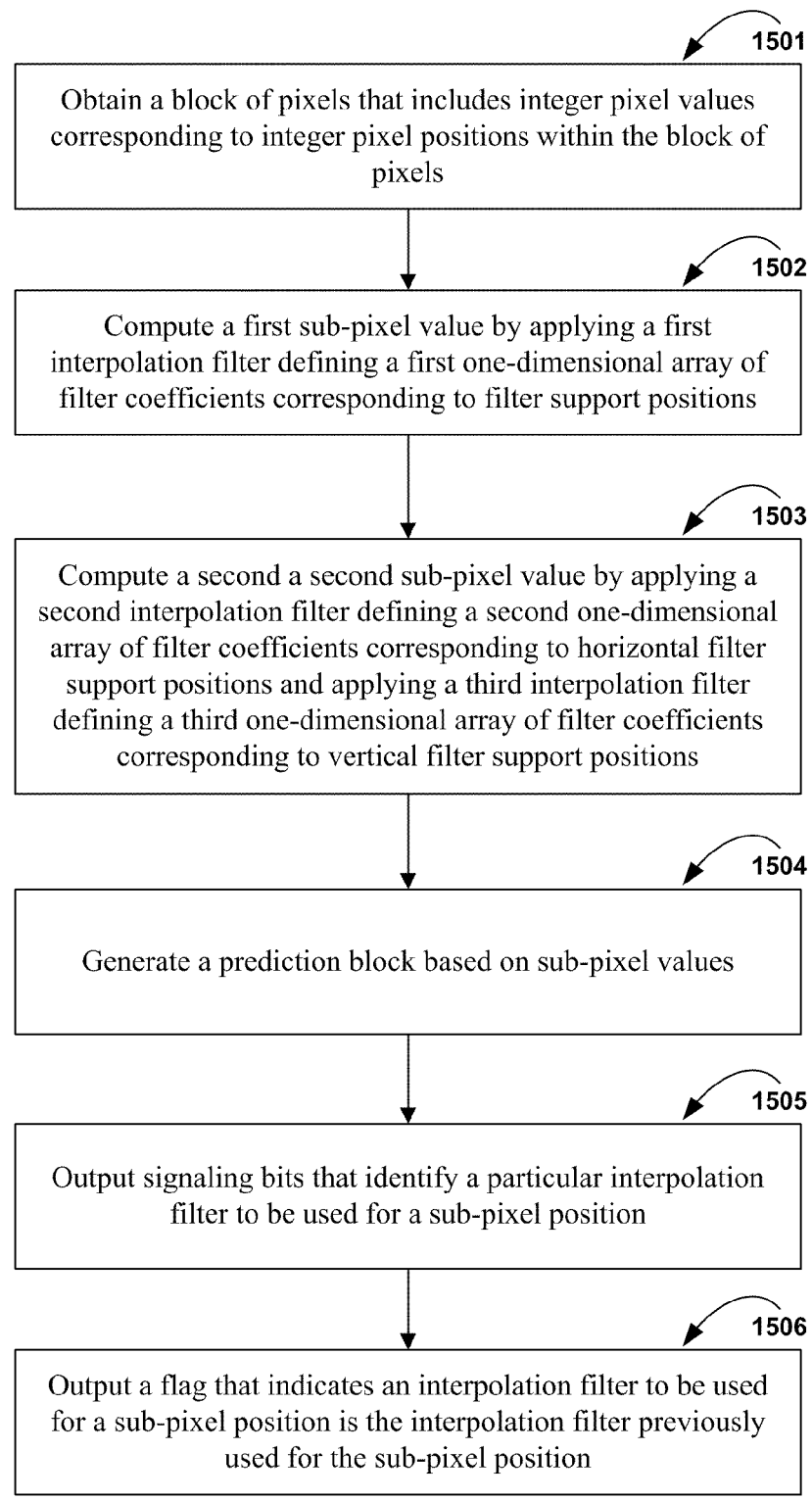
FIG. 15 is a flow diagram for illustrating techniques for interpolation filtering consistent with the present disclosure.

FIG. 15 is a flowchart showing a method that implements aspects of this disclosure. The techniques of FIG. 15 may, for example, be performed by the devices shown in FIGS. 1, 2, and 10. The method of FIG. 15 will be described from the perspective of FIG. 2 although other devices, including both video encoder 22 and video decoder 28 of FIG. 1 and video decoder 60 of FIG. 10 may also perform aspects of the method of FIG. 15. MC unit 37 of prediction unit 32 obtains a block of pixels from memory 34 that includes integer pixel values corresponding to integer pixel positions within the block of pixels (1501). Filtering unit 39 computes sub-pixel values corresponding to sub-pixel positions associated with the block of pixels. Filtering unit 39 computes a first sub-pixel value, for a sub-pixel position on either a common vertical axis with integer pixel positions or a common horizontal axis with integer pixel positions (see e.g. the 1L sub-pixel positions of FIG. 4), by applying a first interpolation filter defining a first one-dimensional array of filter coefficients corresponding to filter support positions (1502). The first interpolation filter may, for example, comprise an 8-tap filter, where the filter support positions for the first interpolation filter correspond to a set of integer pixel positions. Filtering unit 39 computes a second sub-pixel value by applying a second interpolation filter defining a second one-dimensional array of filter coefficients corresponding to horizontal filter support positions and applying a third interpolation filter defining a third one-dimensional array of filter coefficients corresponding to vertical filter support positions (1503). The second sub-pixel value corresponds to a sub-pixel position not on a common vertical axis with integer pixel positions and not on a common horizontal axis with integer pixel positions (see e.g. the 2L sub-pixel positions of FIG. 5). The second and third interpolation filters, might for example, each be 6-tap filters. In accordance with one aspect of this disclosure, the first one-dimensional array includes more filter coefficients than the second one-dimensional array and more filter coefficients than the third one-dimensional array.

Based on sub-pixel values, such as the first sub-pixel value and the second sub-pixel value, MC unit 37 generates a prediction block (1504). In particular, MC unit 37 may generate and output, as part of a video encoding process, an interpolated prediction block with interpolated sub-pixel values. Prediction unit 32 may also output with the prediction block, signaling bits that identify a particular interpolation filter to be used for a sub-pixel position (1505). The signaling bits may separately identify the second interpolation filter and the third interpolation filter or identify a combination of the second interpolation filter and the third interpolation filter. Prediction unit 32 may also output a flag that indicates an interpolation filter to be used for a sub-pixel position is the interpolation filter previously used for the sub-pixel position (1506).

The techniques of this disclosure may be implemented in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. If implemented in hardware, any features described as modules, units or components may be implemented together in an integrated logic device or separately as discrete but interoperable logic devices. If implemented in software, the techniques may be realized at least in part by a computer-readable medium comprising instructions that, when executed in a processor, performs one or more of the methods described above. The computer-readable medium may comprise a non-transitory, computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various aspects of the disclosure have been described. These and other aspects are within the scope of the following claims.

The invention claimed is:

1. A method of coding video data, the method comprising:
applying a first interpolation filter defining a first one-dimensional array of filter coefficients to a first plurality of filter support positions of a block of pixels from a reference picture;
based on the applying of the first interpolation filter to the first plurality of filter support positions, computing a first sub-pixel value for a first sub-pixel position of the block of pixels that is on either a common vertical axis with integer pixel positions or a common horizontal axis with integer pixel positions, wherein the block of pixels includes integer pixel values corresponding to integer pixel positions within the block of pixels;
applying a second interpolation filter defining a second one-dimensional array of filter coefficients including fewer filter coefficients than the first one-dimensional array to a plurality of horizontal filter support positions of the block of pixels from the reference picture;
applying a third interpolation filter defining a third one-dimensional array of filter coefficients including fewer filter coefficients than the first one dimensional array to a plurality of vertical filter support positions of the block of pixels from the reference picture;
based on the applying of the second interpolation filter to the plurality of horizontal filter support positions and the applying of the third interpolation filter to the plurality of vertical filter support positions, computing a second sub-pixel value for a second sub-pixel position of the block of pixels that is not on a common vertical axis with integer pixel positions and not on a common horizontal axis with integer pixel positions, wherein:
the second sub-pixel position is a quarter-pixel position; and
generating a prediction block based on at least the first sub-pixel value and the second sub-pixel value.

2. The method of claim 1, wherein:
the first interpolation filter comprises an 8-tap filter;
the second interpolation filter comprises a 6-tap filter; and,
the third interpolation filter comprises a 6-tap filter.

3. The method of claim 1, wherein the filter support positions for the first interpolation filter correspond to a set of integer pixel positions.

4. The method of claim 1, wherein the method forms part of a video encoding process, the method further comprises:
encoding signaling bits, wherein the signaling bits identify a particular interpolation filter to be used for a sub-pixel position.

5. The method of claim 4, wherein the signaling bits separately identify the second interpolation filter and the third interpolation filter.

6. The method of claim 4, wherein the signaling bits identify a combination comprising the second interpolation filter and the third interpolation filter.

7. The method of claim 1, wherein the method forms part of a video encoding process, the method further comprises:
encoding a flag, wherein the flag indicates an interpolation filter to be used for a sub-pixel position is an interpolation filter previously used for the sub-pixel position.

8. The method of claim 1, wherein the method forms part of a video decoding process, the method further comprises:
decoding signaling bits, wherein the signaling bits identify a particular interpolation filter to be used for a sub-pixel position.

9. An apparatus for coding video data, the apparatus comprising:
a memory configured to store a block of pixels, wherein the block of pixels includes integer pixel values corresponding to integer pixel positions within the block of pixels;
a processor coupled to the memory and configured to:

apply a first interpolation filter defining a first one-dimensional array of filter coefficients to a first plurality of filter support positions of a block of pixels from a reference picture;

based on the applying of the first interpolation filter to the first plurality of filter support positions, compute a first sub-pixel value for a first sub-pixel position of the block of pixels that is on either a common vertical axis with integer pixel positions or a common horizontal axis with integer pixel positions, wherein the block of pixels include integer pixel values corresponding to integer pixel positions within the block of pixels;

apply a second interpolation filter defining a second one-dimensional array of filter coefficients including fewer filter coefficients than the first one-dimensional array to a plurality of horizontal filter support positions of the block of pixels from the reference picture;

apply a third interpolation filter defining a third one-dimensional array of filter coefficients including fewer filter coefficients than the first one dimensional array to a plurality of vertical filter support positions of the block of pixels from the reference picture;

based on the applying of the second interpolation filter to the plurality of horizontal filter support positions and the applying of the third interpolation filter to the plurality of vertical filter support positions, compute a second sub-pixel value for a second sub-pixel position of the block of pixels that is not on a common vertical axis with integer pixel positions and not on a common horizontal axis with integer pixel positions, wherein the second sub-pixel position is a quarter-pixel position; and generate a prediction block based on at least the first sub-pixel value and the second sub-pixel value.

10. The apparatus of claim 9, wherein:
the first interpolation filter comprises an 8-tap filter;
the second interpolation filter comprises a 6-tap filter; and,
the third interpolation filter comprises a 6-tap filter.

11. The apparatus of claim 9, wherein the filter support positions for the first interpolation filter correspond to a set of integer pixel positions.

12. The apparatus of claim 9, wherein the processor is further configured to generate signaling bits, wherein the signaling bits identify a particular interpolation filter to be used for a sub-pixel position.

13. The apparatus of claim 12, wherein the signaling bits separately identify the second interpolation filter and the third interpolation filter.

14. The apparatus of claim 12, wherein the signaling bits identify a combination comprising the second interpolation filter and the third interpolation filter.

15. The apparatus of claim 9, wherein the processor is further configured to generate a flag for transmission, wherein the flag indicates an interpolation filter to be used for a sub-pixel position is an interpolation filter previously used for the sub-pixel position.

16. The apparatus of claim 9, wherein the processor is further configured to decode signaling bits, wherein the signaling bits identify a particular interpolation filter to be used for a sub-pixel position.

17. The apparatus of claim 9, wherein the processor is further configured to decode a flag, wherein the flag indicates an interpolation filter to be used for a sub-pixel position is an interpolation filter previously used for the sub-pixel position.

18. The apparatus of claim 9, wherein the processor is a component of a video encoding device.

19. The apparatus of claim 9, wherein the processor is a component of a video decoding device.

20. An apparatus for coding video data, the apparatus comprising:

means for applying a first interpolation filter defining a first one-dimensional array of filter coefficients to a first plurality of filter support positions of a block of pixels from a reference picture;

means for computing, based on the applying of the first interpolation filter to the first plurality of filter support positions, a first sub-pixel value for a first sub-pixel position of the block of pixels that is on either a common vertical axis with integer pixel positions or a common horizontal axis with integer pixel positions, wherein the block of pixels includes integer pixel values corresponding to integer pixel positions within the block of;

means for applying a second interpolation filter defining a second one-dimensional array of filter coefficients including fewer filter coefficients than the first one-dimensional array to a plurality of horizontal filter support positions of the block of pixels from the reference picture;

means for applying a third interpolation filter defining a third one-dimensional array of filter coefficients including fewer filter coefficients than the first one dimensional array to a plurality of vertical filter support positions of the block of pixels from the reference picture;

means for computing, based on the applying of the second interpolation filter to the plurality of horizontal filter support positions and the applying of the third interpolation filter to the plurality of vertical filter support positions, a second sub-pixel value for a second sub-pixel position of the block of pixels that is not on a common vertical axis with integer pixel positions and not on a common horizontal axis with integer pixel positions, wherein the second sub-pixel position is a quarter-pixel position; and means for generating a prediction block based on at least the first sub-pixel value and the second sub-pixel value.

21. The apparatus of claim 20, wherein:
the first interpolation filter comprises an 8-tap filter;
the second interpolation filter comprises a 6-tap filter; and,
the third interpolation filter comprises a 6-tap filter.

22. The apparatus of claim 20, wherein the filter support positions for the first interpolation filter correspond to a set of integer pixel positions.

23. The apparatus of claim 20, furthering comprising:
means for encoding signaling bits, wherein the signaling bits identify a particular interpolation filter to be used for a sub-pixel position.

24. The apparatus of claim 23, wherein the signaling bits separately identify the second interpolation filter and the third interpolation filter.

25. The apparatus of claim 23, wherein the signaling bits identify a combination comprising the second interpolation filter and the third interpolation filter.

26. The apparatus of claim 20, further comprising:
means for encoding a flag, wherein the flag indicates an interpolation filter to be used for a sub-pixel position is an interpolation filter previously used for the sub-pixel position.

27. The apparatus of claim 20, furthering comprising:
means for decoding signaling bits, wherein the signaling bits identify a particular interpolation filter to be used for a sub-pixel position.

28. The apparatus of claim 20, further comprising:
means for decoding a flag, wherein the flag indicates an interpolation filter to be used for a sub-pixel position is an interpolation filter previously used for the sub-pixel position.

29. A non-transitory computer readable storage medium having stored thereon one or more instructions, which when executed by one or more processors cause the one or more processors to:
apply a first interpolation filter defining a first one-dimensional array of filter coefficients to a first plurality of filter support positions of a block of pixels from a reference picture;
based on the applying of the first interpolation filter to the first plurality of filter support positions, compute a first sub-pixel value for a first sub-pixel position of the block of pixels that is on either a common vertical axis with integer pixel positions or a common horizontal axis with integer pixel positions, wherein the block of pixels includes integer pixel values corresponding to integer pixel positions within the block of;
apply a second interpolation filter defining a second one-dimensional array of filter coefficients including fewer filter coefficients than the first one-dimensional array to a plurality of horizontal filter support positions of the block of pixels from the reference picture;
apply a third interpolation filter defining a third one-dimensional array of filter coefficients including fewer filter coefficients than the first one dimensional array to a plurality of vertical filter support positions of the block of pixels from the reference picture;
based on the applying of the second interpolation filter to the plurality of horizontal filter support positions and the applying of the third interpolation filter to the plurality of vertical filter support positions, compute a second sub-pixel value for a second sub-pixel position of the block of pixels that is not on a common vertical axis with integer pixel positions and not on a common horizontal axis with integer pixel positions, wherein
the second sub-pixel position is a quarter-pixel position;
generate a prediction block based on at least the first sub-pixel value and the second sub-pixel value.

30. The computer readable storage medium of claim 29, wherein:
the first interpolation filter comprises an 8-tap filter;
the second interpolation filter comprises a 6-tap filter; and,
the third interpolation filter comprises a 6-tap filter.

31. The computer readable storage medium of claim 29, wherein the filter support positions for the first interpolation filter correspond to a set of integer pixel positions.

32. The computer readable storage medium of claim 29, storing one or more additional instructions, which when executed by the one or more processors cause the one or more processors to:
encode signaling bits, wherein the signaling bits identify a particular interpolation filter to be used for a sub-pixel position.

33. The computer readable storage medium of claim 32, wherein the signaling bits separately identify the second interpolation filter and the third interpolation filter.

34. The computer readable storage medium of claim 3, wherein the signaling bits identify a combination comprising the second interpolation filter and the third interpolation filter.

35. The computer readable storage medium of claim 29, storing one or more additional instructions, which when executed by the one or more processors cause the one or more processors to:
encode a flag, wherein the flag indicates an interpolation filter to be used for a sub-pixel position is an interpolation filter previously used for the sub-pixel position.

36. The computer readable storage medium of claim 29, storing one or more additional instructions, which when executed by the one or more processors cause the one or more processors to:
decode signaling bits, wherein the signaling bits identify a particular interpolation filter to be used for a sub-pixel position.

37. The computer readable storage medium of claim 29, storing one or more additional instructions, which when executed by the one or more processors cause the one or more processors to:
decode a flag, wherein the flag indicates an interpolation filter to be used for a sub-pixel position is an interpolation filter previously used for the sub-pixel position.

* * * * *